US010332317B2

(12) United States Patent
Nagy et al.

(10) Patent No.: US 10,332,317 B2
(45) Date of Patent: Jun. 25, 2019

(54) VIRTUAL REALITY AND CROSS-DEVICE EXPERIENCES

(71) Applicant: MICROSOFT TECHNOLOGY LICENSING, LLC, Redmond, WA (US)

(72) Inventors: Scott Anderson Nagy, Seattle, WA (US); Jason Carter, Edmonds, WA (US); Anatolie Gavriliuc, Kirkland, WA (US); Daniel L. Osborn, Woodinville, WA (US); Kathleen Mulcahy, Seattle, WA (US); Patrick C. Ryan, Poulsbo, WA (US); Michelle Tze Hiang Chua, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1 day.

(21) Appl. No.: 15/616,613

(22) Filed: Jun. 7, 2017

(65) Prior Publication Data

US 2018/0114372 A1 Apr. 26, 2018

Related U.S. Application Data

(60) Provisional application No. 62/412,760, filed on Oct. 25, 2016.

(51) Int. Cl.
*G06T 19/20* (2011.01)
*G06F 3/0484* (2013.01)
(Continued)

(52) U.S. Cl.
CPC .............. *G06T 19/20* (2013.01); *G06F 3/011* (2013.01); *G06F 3/04842* (2013.01);
(Continued)

(58) Field of Classification Search
CPC ............................ G06T 19/006; G06T 19/20; G06T 2219/024; G06F 3/04815
(Continued)

(56) References Cited

U.S. PATENT DOCUMENTS 8,862,987 B2   10/2014   Haussecker et al.
9,003,424 B1    4/2015   Mendes Da Costa et al.
(Continued)

FOREIGN PATENT DOCUMENTS

CN   104615421      5/2015
EP   0753836 A2    1/1997
EP   2506222 A2   10/2012

OTHER PUBLICATIONS

Nafarrete, Jonathan, "Tilt Brush Adds Rotate, Resize, Import of 3D Models and Pictionary", http://vrscout.com/news/tilt-brush-adds-rotate-resize-import-3d-models-pictionary/, Published on: Sep. 8, 2016, 7 pages.

(Continued)

*Primary Examiner* — Thomas J Lett
(74) *Attorney, Agent, or Firm* — Shook Hardy Bacon L.L.P.

(57) ABSTRACT

The present disclosure provides approaches to facilitating virtual reality and cross-device experiences. In some implementations, an environmental snapshot is captured which includes an image of a virtual reality (VR) environment presented on a VR device and corresponding depth information of the VR environment. The image of the environmental snapshot is presented on a different device than the VR device. A user modification to content associated with the presented image is translated into the environmental snapshot based on the depth information. The environmental snapshot comprising the user modification is translated into the VR environment. The VR environment comprising the translated user modification is presented. The environmental (Continued)

snapshot may correspond to a personal space of a user and may be accessed by another user through a social networking interface or other user networking interface to cause the presentation of the image.

20 Claims, 21 Drawing Sheets

(51) Int. Cl.
    *G06T 19/00*      (2011.01)
    *G06F 3/01*      (2006.01)
    *G06F 3/0481*      (2013.01)

(52) U.S. Cl.
    CPC ........ *G06T 19/006* (2013.01); *G06F 3/04815* (2013.01); *G06T 2219/024* (2013.01); *G06T 2219/2016* (2013.01)

(58) Field of Classification Search
    USPC .......................................................... 345/419
    See application file for complete search history.

(56) References Cited

U.S. PATENT DOCUMENTS

| | | |
|---|---|---|
| 2002/0049814 A1 | 4/2002 | Yoo |
| 2008/0215975 A1 | 9/2008 | Harrison et al. |
| 2009/0106776 A1 | 4/2009 | Kim et al. |
| 2009/0113349 A1 | 4/2009 | Zohar et al. |
| 2010/0208033 A1 | 8/2010 | Edge et al. |
| 2012/0092475 A1 | 4/2012 | Li |
| 2012/0233555 A1 | 9/2012 | Psistakis et al. |
| 2012/0293487 A1 | 11/2012 | Betzler et al. |
| 2013/0013699 A1 | 1/2013 | Huxley |
| 2015/0063681 A1 | 3/2015 | Bhardwaj et al. |
| 2015/0089452 A1 | 3/2015 | Dorninger |
| 2016/0027053 A1 | 1/2016 | Van datta et al. |
| 2016/0027210 A1 | 1/2016 | The et al. |
| 2016/0133230 A1* | 5/2016 | Daniels ................. G06T 19/006 345/633 |
| 2016/0217615 A1 | 7/2016 | Kraver |
| 2016/0217616 A1 | 7/2016 | Kraver |
| 2016/0227132 A1 | 8/2016 | Wooley et al. |
| 2016/0253844 A1 | 9/2016 | Petrovskaya et al. |
| 2017/0228239 A1* | 8/2017 | Elassaad ................. G06F 9/451 |
| 2017/0243403 A1* | 8/2017 | Daniels ................. G06T 19/006 |

OTHER PUBLICATIONS

"International Search Report & Written Opinion Issued in PCT Application No. PCT/US2017/056706", dated Feb. 12, 2018, 13 Pages.

* cited by examiner

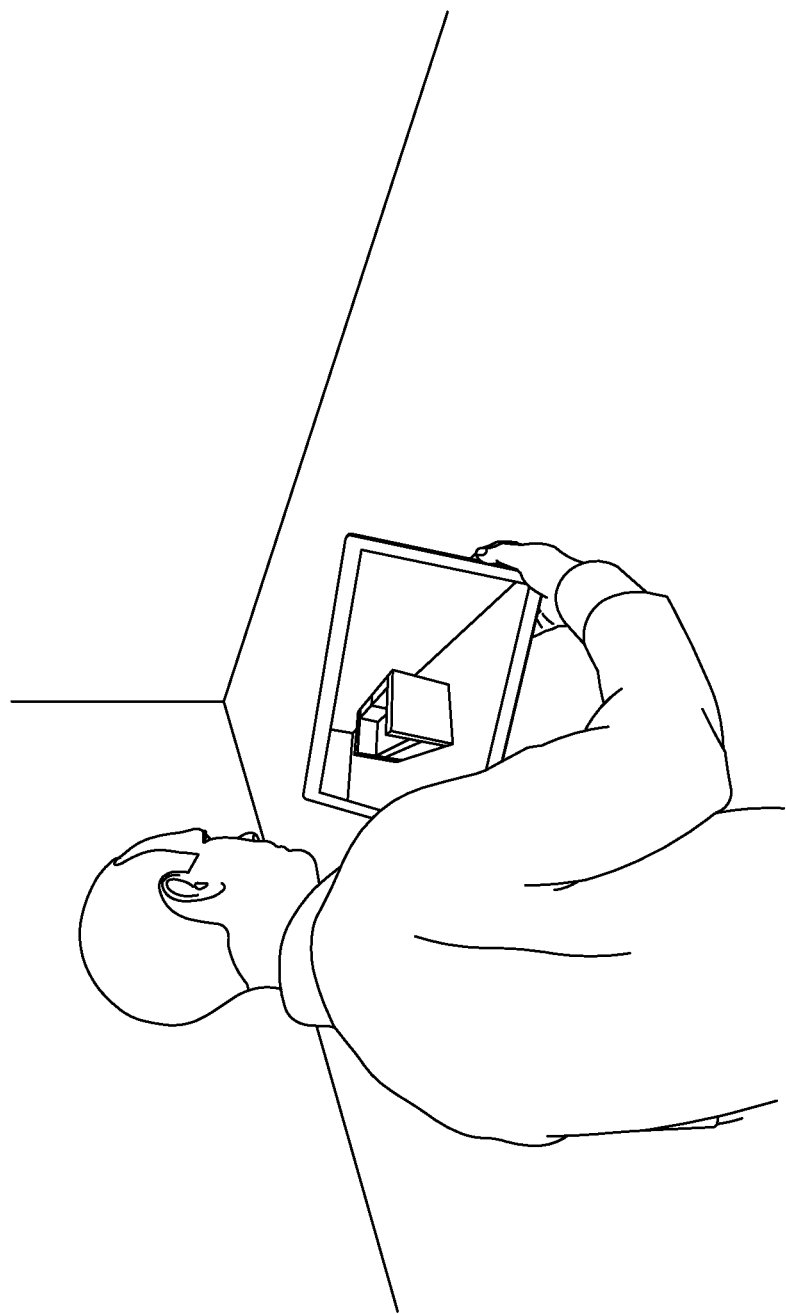

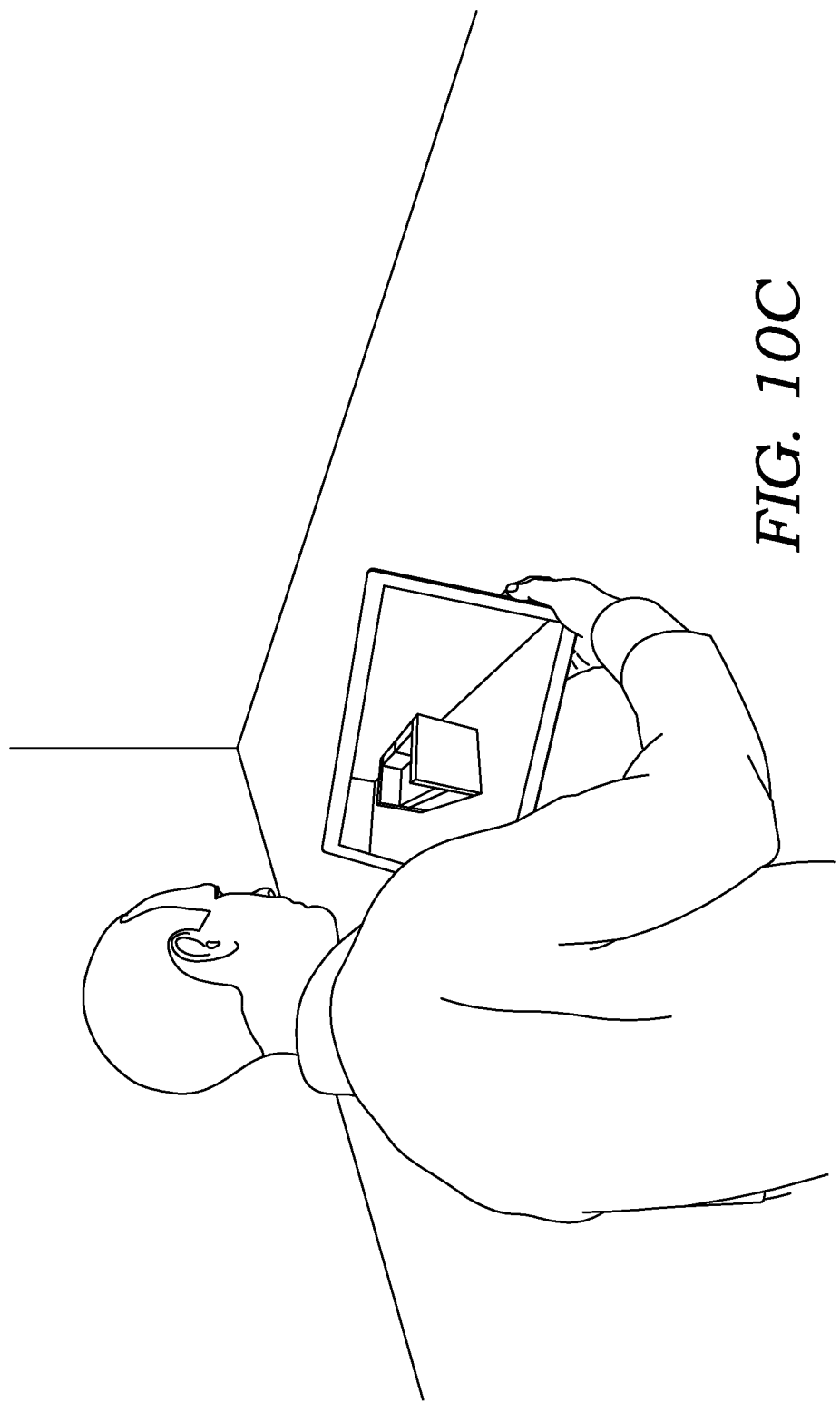

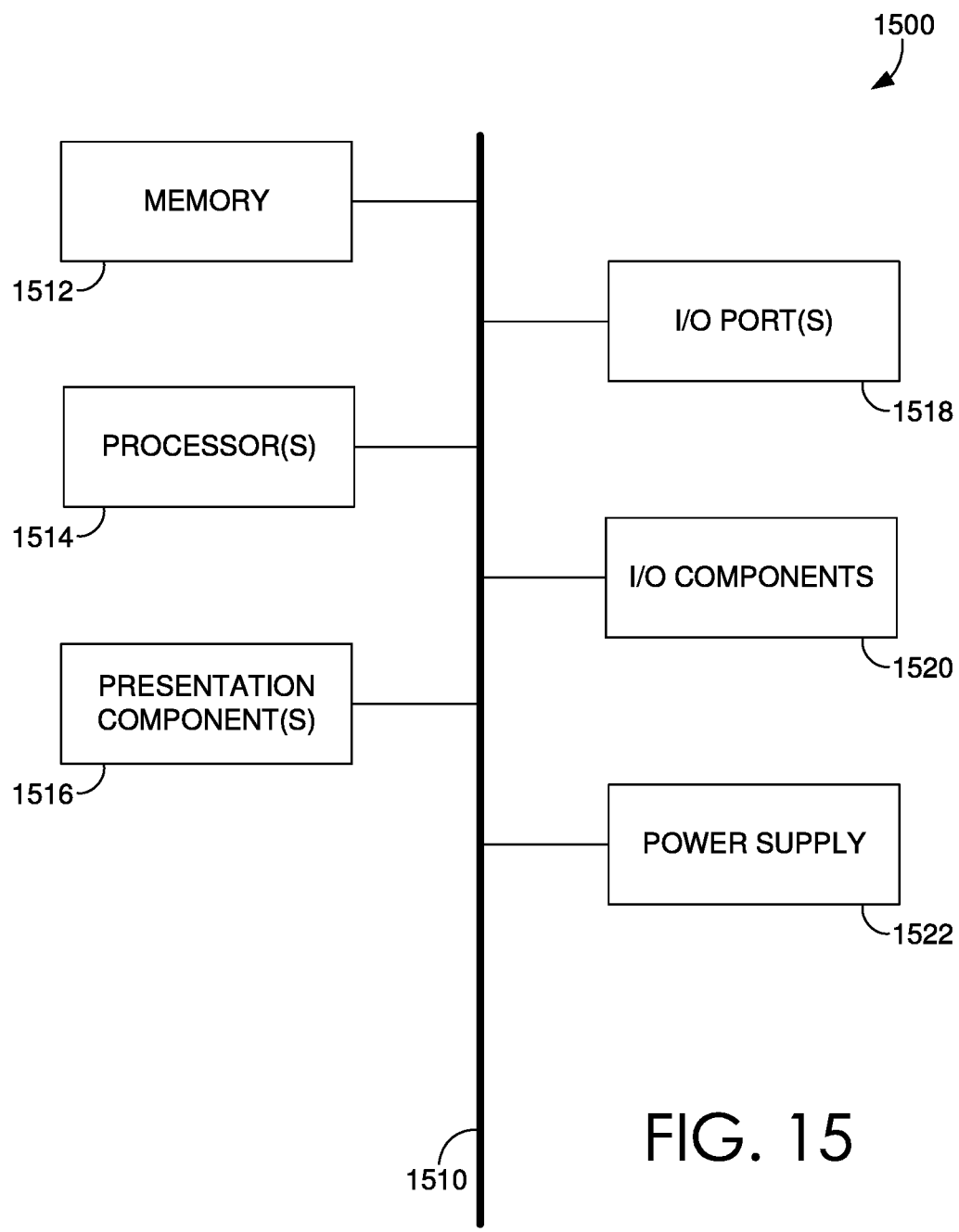

VIRTUAL REALITY AND CROSS-DEVICE EXPERIENCES

CROSS-REFERENCE TO RELATED APPLICATIONS

This application claims the benefit of U.S. Provisional Application No. 62/412,760, titled "Virtual Reality and Cross-Device Experiences," filed Oct. 25, 2016, which is hereby expressly incorporated by reference in its entirety.

BACKGROUND

Virtual reality devices, such as head-mounted virtual reality devices, may be used in a variety of real and/or virtual world environments and contexts. Augmented reality devices are types of virtual reality devices that can support direct or indirect views of a real world environment along with augmented reality objects digitally projected on the real world scene. Augmented reality devices can also operate as scene-aware devices that have an understanding of a real world environment defined as an augmented reality environment (i.e., virtual environment) supported by the augmented reality device. An augmented reality device can support presentation of the augmented reality objects, which are virtualized entities (e.g., holographic content or mixed-reality content), that are rendered for a user associated with the augmented reality device. The augmented reality objects can be rendered based on the real world environment captured by the augmented reality device.

BRIEF DESCRIPTION OF THE DRAWINGS

The present invention is described in detail below with reference to the attached drawing figures, wherein:

FIG. 9B illustrates a user viewing a 3D space, in accordance with embodiments of the present invention;

FIG. 10C illustrates a user viewing a 3D space, in accordance with embodiments of the present invention;

FIG. 15 is a block diagram of an example computing environment suitable for use in implementing embodiments of the present invention.

DETAILED DESCRIPTION

Figure 1:
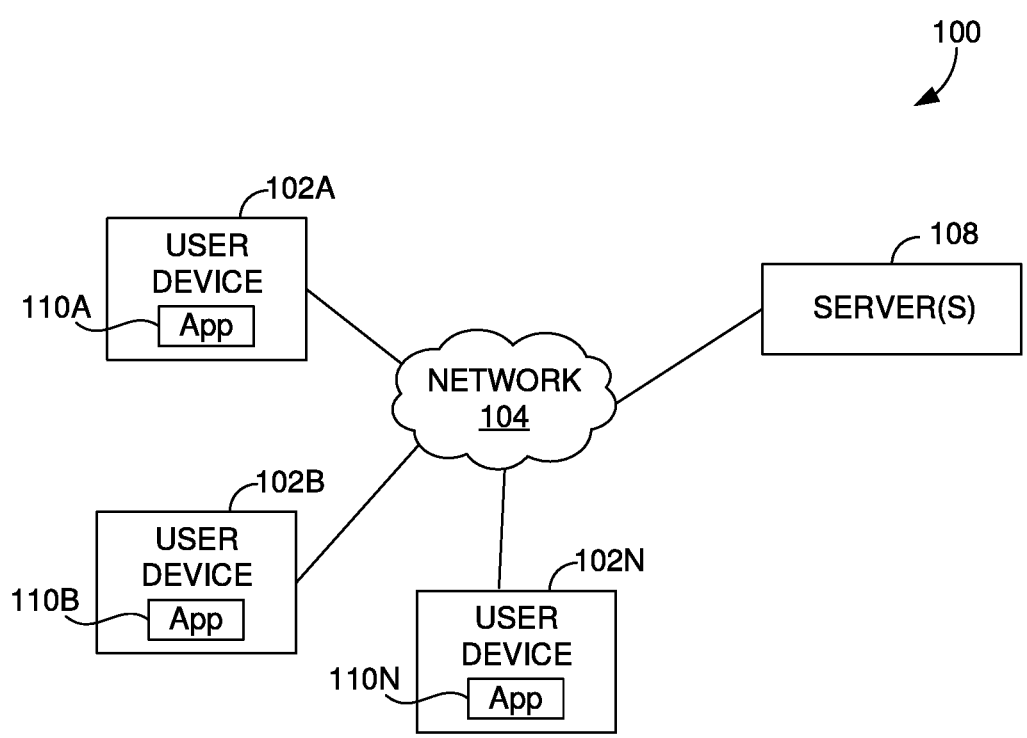
FIG. 1 is an illustration of an example operating environment, in accordance with embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In some aspects of the present disclosure, a 3D space may be captured in an environmental snapshot. The 3D space can be a real world environment, a virtual environment, or a mixed-reality environment. The environmental snapshot can include a 2.5D image or picture having metadata (e.g., embedded within), which includes 3D information describing the 3D space, such as depth information, virtual and/or real object locations and/or other object attributes, and the like.

In some cases, the environmental snapshot is captured using a virtual reality device, such as an augmented reality device. Examples of suitable devices include a head-mounted display device or a handheld or mobile device. Each of these devices may be equipped with one or more sensors capable of capturing the 3D space. This can include, for example, one or more depth sensors which may be included in one or more depth sensing cameras (e.g., an RGB-D camera). The virtual reality device may determine and capture any of the various metadata based at least on the 3D information, and associate the metadata with the snapshot, such as by embedding the metadata in the snapshot In some cases, a user may be viewing a 3D space on a virtual reality device, and the device may take the snapshot based on what the user has viewed or is viewing in the 3D space (e.g., from the user's perspective). As one option, the user may selectively take a photo or snapshot of the environment (e.g., by pressing a button on screen), causing the snapshot with the metadata to be generated. The metadata, such as the 3D information need not be based on a single device pose (e.g., at the time the snapshot is taken), but can include 3D information captured from a variety of device poses, including different angles, positions, perspectives, and distances. However, the perspective captured by the 2.5D image or photo (e.g., bitmap) may be based on the device pose corresponding to when the snapshot was taken and/or the display on the device when the snapshot was taken. In some cases, the perspective, device pose, and/or other positional information is included in the metadata.

In further respects, the present disclosure provides for viewing and augmenting 2.5D snapshots of 3D spaces. For example, a different device than the device used to capture an environmental snapshot may be used to view and/or augment the snapshot. In some cases, this device is not a virtual reality device. For example, this device may not be equipped with a depth sensor and/or head-mounted display. Examples include laptops, desktops, and mobile phones, and tablets. While viewing an environmental snapshot, the displayed view may be based on the metadata, such as the perspective information and/or 3D information captured in the snapshot. The viewer may in some cases limit changes to the displayed perspective captured in the snapshot. For example, the displayed perspective may be fixed or limited based on the captured perspective. In some cases, parallax can be applied to the display to modify the view.

In viewing an environmental snapshot, a user may modify the snapshot, such as by adding content to the snapshot, removing content from the snapshot, and/or changing content within the snapshot. This content can include 3D objects, 2D images, decals, drawings, audio, video, text, animations, colors, and/or other content. In various implementations, at least some of the content can be placed in the environmental snapshot (e.g., by a user) based on the metadata of the snapshot. For example, based on the 3D information, the content can be positioned in the environmental snapshot. This information can be used to translate the content into the environmental snapshot. For example, the 3D information can be used to determine the size of the content, the rotation of the content, and/or the angle of the content. Thus, the metadata can define content placement parameters for content. As another example, depth information can be used place content behind content (e.g., real or virtual objects) captured in the original snapshot or later added to the snapshot.

Thus, using the depth information, in some implementations, a user can use a graphical interface to draw on a wall captured in a snapshot, which can track the angle and distance of the wall. As another example, the user can place content behind other content, such as on a countertop depicted in the snapshot with a size scaled based on distance information in the snapshot. Any changes made by the user to the environmental snapshot may be saved in the snapshot's metadata.

In further respects, the present disclosure provides for converting an environmental snapshot, such as the 2.5D snapshot described above, into a mixed-reality or virtual reality environment. For example, the system may propagate changes made to the environmental snapshot into the 3D environment or space corresponding to the snapshot. As an example, the system may make the modifications in the 3D space, which correspond to the environmental snapshot. Thus, if a user places an object on a desk, the system could identify this change to the 3D space from the environmental snapshot (e.g., the metadata) and incorporate the change into the 3D space. As an example, a user viewing the 3D space, such as with a virtual reality device, may see the changes made to the environmental space reflected in the 3D space.

In further respects, the present disclosure provides for personal spaces, or spaces associated with one or more particular users. For example, each user of a system may be associated with one or more spaces. A space can, for example, correspond to the 3D space described above and/or the 2D environmental snapshot taken of the 3D space. In various implementations, other users may access a personal space associated with another user. For example, an owner of a personal space may share the personal space with the user or may otherwise provide access to one or more users. Accessing a personal space can include viewing the personal space and/or modifying the personal space (e.g., there may be different access permissions, which could be different for different accessing users).

Where the personal space comprises an environmental snapshot, accessing users may view and/or modify the environmental snapshot, as described above. In addition, or instead, an accessing user may view and/or modify the corresponding 3D space. In some cases, the space a user accesses could be based on the hardware capabilities of a device the user employs for the accessing. For example, users with virtual reality devices may be permitted to or given the option to access a 3D space in addition to or instead of an environmental snapshot, whereas users with non-virtual reality devices may be permitted to or able to only access the environmental snapshot. Modifications made to the personal space by an accessing user may be viewable to the owner or owners of the space (e.g., asynchronously). For example, a 2.5D snapshot should be translated to the 3D space as described above.

Further aspects of the present disclosure relate to triggering one or more virtual objects based on trigger criteria, or conditions, corresponding to a position and/or orientation of a user device with respect to a 3D space. Triggering a virtual object can include displaying a virtual object, animating a virtual object, moving, rotating, and/or otherwise changing positioning of a virtual object in the 3D space, modifying colors, textures, and/or other object properties or characteristics (e.g. visual properties). These trigger actions may be predefined for the object and different sets of trigger actions may be associated with different trigger criteria for the same virtual object.

As an example, trigger criteria of a virtual object can be based on proximity of a user and/or user device with respect to the virtual object (e.g., geo based). For example, in a mixed-reality environment, the real world position of the user and/or user device can be determined (e.g., using device sensors) in a 3D virtual space comprising the virtual object. It will be appreciated that in virtual environments, the user and/or device position may not correspond to real world coordinates. In some care trigger criteria can correspond to a user holding the user device. For example, to determine the criteria is satisfied, the system may determine (infer) a user is holding the device.

In some cases, a trigger action includes capturing a user reaction to a virtual object and/or one or more trigger actions corresponding to the virtual object. A user reaction can be captured, for example, with a camera, such as a camera (e.g., a front-facing camera) on a user device the user is using to view the 3D space. For example, based on trigger criteria being satisfied, the user device may automatically activate a camera and capture a photo and/or video of the user.

To illustrate the forgoing, assume a virtual object appears as a present on a table on a user device, as the user approaches the present, the user enters a proximity to the object which is a trigger criterion for activating recording on a front-facing camera of the user device. As the user gets closer, the trigger criterion is satisfied causing the present to visibly shake. As the user gets even closer, a trigger action could cause the present could animate and open revealing its contents. Completion of this trigger action may cause the device to automatically deactivate the camera.

In some cases, the system transfers photos and/or video of a user reaction to another user (e.g., as part of a trigger action). For example, a trigger action (e.g., proximity based) could cause a notification to be sent to one or more other users. This notification may include a link to a stream of the reaction, which could be in real-time as captured by reaction capturer 218. As another example, the captured user reaction could be saved for later viewing by the other user. In this case photos or video files could be sent to the other user or the other user could be provided with a download link.

It some respects, whether a user reaction of a user is shared with another user may be subject to sharing preferences of the user. These sharing preferences could be set up by the user in advance of capture of the user reaction. In addition, or instead, after capture, the system may prompt the user as to whether to share the user reaction and/or for which user or users to share the user reaction with.

In some implementations, the virtual object having the trigger criteria and trigger actions may be provided to the 3D space by another user. This user could, for example, be a user viewing and/or modifying a personal space corresponding to the 3D space, such as has been described above. For example, the user may add the virtual object to the personal space. In some cases, the trigger conditions and/or actions are set or configured by the user through a graphical interface. However, at least some of the parameters may be preconfigured. For example, a user could select a virtual object from a catalogue where each virtual object has one or more associated trigger actions and trigger criteria. A user may through a user interface adjust for example, proximity settings, ranges, and/or distances.

In further respects, a user may be automatically notified of a user reaction based on trigger criteria. This notification could be based on the user being associated with the 3D space. In some cases, a notification is based on the user having provided the virtual object corresponding to the trigger condition to the 3D space. For example, based on a user modifying an environmental snapshot with the virtual object, the system may associate that user with the trigger action resulting in providing the notification to the user.

In addition, or instead, trigger criteria can based on whether a position in the 3D space corresponding to the virtual object is visible on the user device and/or to the user. For example, a trigger action may be triggered based on a virtual object coming into view on a user device. The system can make this determination, for example, based on a device pose of the device. As another example a trigger criterion could be based on the position corresponding to the virtual object is not visible or becomes not visible on the user device and/or to the user.

From the forgoing, it will be appreciated that this disclosure captures a variety of concepts, which may be severable or combinable in any suitable arrangement.

Turning now to FIG. 1, a block diagram is provided showing an example of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102*a* and 102*b* through 102*n*, network 104, and server(s) 108.

It should be understood that operating environment 100 shown in FIG. 1 is an example of one suitable operating environment. Each of the components shown in FIG. 1 may be implemented via any type of computing device, such as one or more of computing device 1500 described in connection to FIG. 15, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other disclosed components may be employed within operating environment 100 within the scope of the present disclosure. Each may comprise a single device or multiple devices cooperating in a distributed environment.

User devices 102*a* through 102*n* comprise any type of computing device capable of being operated by a user. For example, in some implementations, user devices 102*a* through 102*n* can be the type of computing device described in relation to FIG. 14 and/or FIG. 15 herein. By way of example and not limitation, a user device may be embodied as a virtual reality device, a mixed-reality device, an augmented reality device, a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, a 3D scanning device, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110A shown in FIG. 1. Application 110A is referred to as a single application for simplicity, but its functionality can be embodied by one or more applications in practice. As indicated above, the other user devices can include one or more applications similar application 110A, such as applications 110B and 110N.

The application(s) may generally be any application capable of facilitating the exchange of information between the user devices and the server(s) 108 in carrying out functionality described in the present disclosure. In some implementations, the application(s) comprises a web application, which can run in a web browser, and could be hosted at least partially on the server-side of operating environment 100. In addition, or instead, the application(s) can comprise a dedicated application, such as an application having image processing functionality. In some cases, the application is integrated into the operating system (e.g., as one or more services). It is therefore contemplated herein that "application" be interpreted broadly.

Server(s) 108 also includes one or more processors, and one or more computer-readable media. The computer-readable media includes computer-readable instructions executable by the one or more processors.

Any combination of the instructions of server(s) 108 and/or user devices 102a through 102n may be utilized to implement one or more components of system 206 of FIG. 2, which is described in additional detail below.

Figure 2:
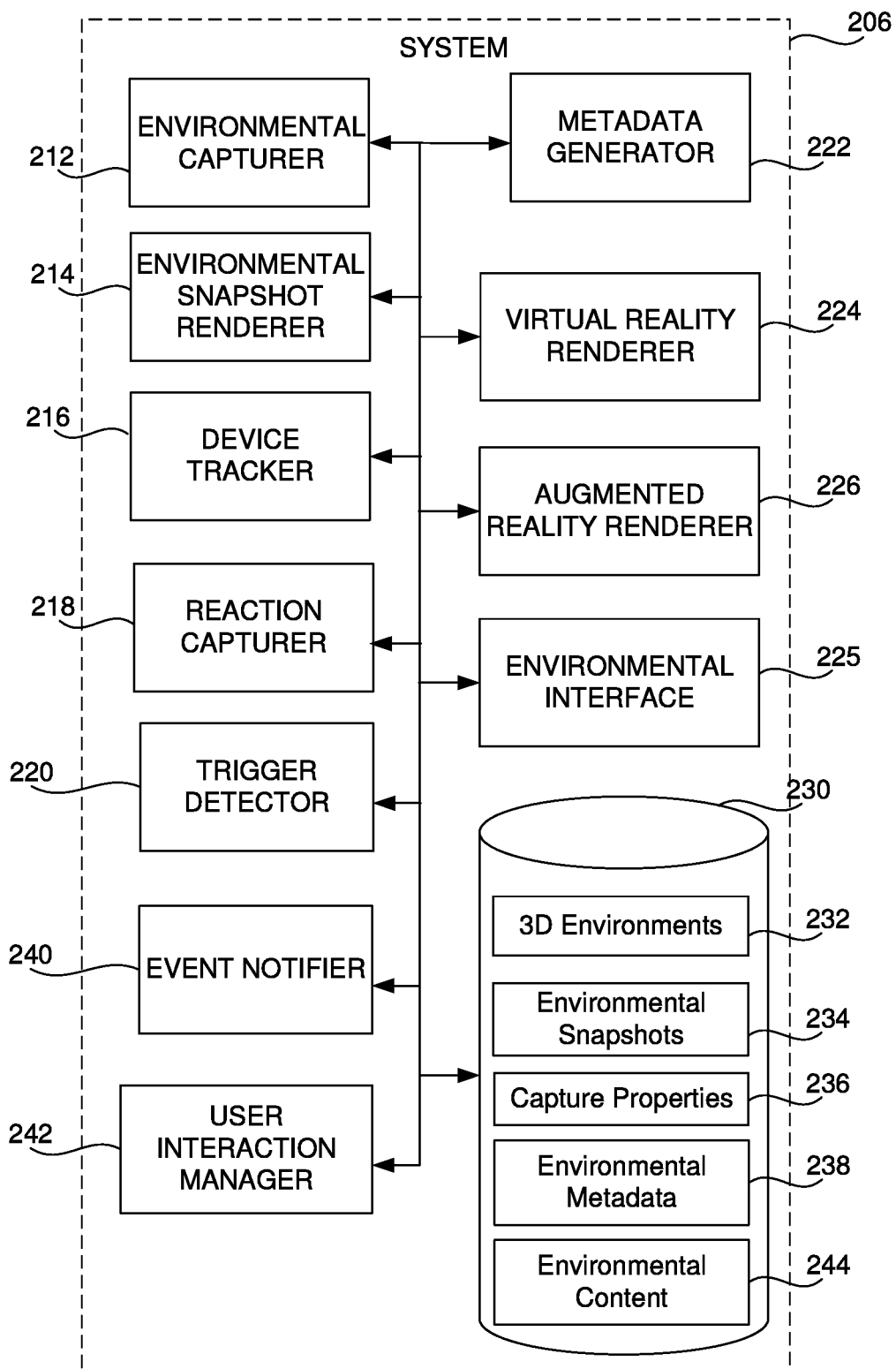
FIG. 2 is an illustration of an example system, in accordance with embodiments of the present invention.

Referring to FIG. 2, a block diagram of a system, in accordance with embodiments of the present disclosure. System 206 includes environmental capturer 212, environmental snapshot renderer 214, device tracker 216, reaction capturer 218, trigger detector 220, event notifier 240, user interaction manager 242, metadata generator 222, virtual reality renderer 224.

As indicated above, the foregoing components of system 206 can be implemented, for example, in operating environment 100 of FIG. 1. In particular, those components may be integrated into any suitable combination of user devices 102a and 102b through 102n, and server(s) 108. For cloud-based implementations, the instructions on server 108 may implement one or more components or portions thereof of system 206, and application 110A, application 110B, or application 110N may be utilized by a user to interface with the functionality implemented on server(s) 108. In some cases, server 108 may not be required. In these cases, system 206 may be embodied at least partially by the instructions corresponding to applications 110A, 110B and/or 110N.

Thus, it should be appreciated that system 206 may be provided via multiple devices arranged in a distributed environment that collectively provide the functionality described herein. Additionally, other components not shown may be included within the distributed environment. In addition, or instead, system 206 can be integrated, at least partially, into a user device, such as user device 102a. Furthermore, system 206 may at least partially be embodied as a cloud computing service.

It should further be appreciated that system 206 does may not require each component shown in FIG. 2 for each embodiment captured by the present disclosure.

Storage 230 can comprise computer-readable media and is configured to store computer instructions (e.g., software program instructions, routines, or services), data, and/or models used in embodiments described herein. In some implementations, storage 230 stores information or data received via the various components of system 206 and provides the various components with access to that information or data, as needed. In implementations, storage 230 comprises a data store (or computer data memory). Although depicted as a single component, storage 230 may be embodied as one or more data stores and may be at least partially in the cloud. Further, the information in storage 230 may be distributed in any suitable manner across one or more data stores for storage (which may be hosted externally).

In the implementation shown, storage 230 includes at least 3D environments 232, environmental snapshots 234, capture properties 236, environmental metadata 238, and environmental content 244, which are described in further detail below.

Environmental interface 225 optionally provides a user interface to environmental capturer 212, which in some implementations collects sensor data from one or more sensors via one or more devices, such as one or more of user devices 102a through 102n in FIG. 1. Environmental capturer 212 may analyze the sensor data and translate the sensor data into a 3D environment, or 3D space, which may correspond to one of 3D environments 232, examples of which have been described above. The 3D space can include scanned geometry features and scanned attribute features (e.g., textures, colors, sounds, movements, animations, and the like) for 3D objects and/or geometry.

Environmental interface 225 can employ virtual reality render 224 to render virtual reality environments corresponding to a 3D space, or augmented reality renderer 226 to render augmented reality or mixed-reality environments corresponding to a 3D space. One or more of these renderers may be incorporated into an application, such one or more of applications 110A, 110B, and 110N. In addition, or instead, one or more of the application may employ environmental snapshot renderer 214, which environmental interface 225 can employ to render environmental snapshots, such as 2.5D environmental snapshots, as has been described above. In should be appreciated that each application may employ one to all of the renderer types, as needed to carry out aspects of the present disclosure. This may depend upon the hardware features available on the user device, as described above.

Environmental interface 225 can further employ metadata generator 222 to generate metadata from 3D spaces (e.g., 3D environments 232), such as a 3D space captured using environmental capturer 212, or a pre-existing 3D space, which does not necessarily correspond to the real world. Examples of metadata have been described above. Metadata generator 222 may further embed the metadata in environmental snapshots or otherwise associated metadata with environmental snapshots, as described above.

In some cases, metadata comprises a location and/or venue corresponding to the environmental snapshot. For example, metadata generator 222 can determine the location metadata from GPS receiver data from a user device, such as the user device capturing the environmental snapshot. The location can correspond to or comprise GPS coordinates. Thus, in various implementations, the location or venue corresponds to the location or venue the user device was in when the environmental snapshot was taken.

Device tracker 216 is configured to track the location of a user device, such as user device 102A, and may be integrated into application 110A. In some cases, device tracker 216 provides the location data as needed to any of the various components of system 206. For example, device tracker 216 can provide location information to metadata generator 222 to generate the location metadata. In addition, or instead, the device tracking can be used by environmental interface 225 to track user and/or device location, such as to render virtual or augmented reality experiences and/or capture 3D spaces. To this effect, device tracker 216 may comprise any of various device and location tracking technologies.

Device tracker 216 may in some implementations track and monitor the device pose of the user device, which may be in real-time. Device tracker 216 may compute in real-time the camera trajectory and a sparse 3D reconstruction of a scene. In some implementations, device tracker 216 uses optical based tracking and/or inertial measurement unit (IMU) based device tracking along with image processing to track the position of the capture device. The tracking can comprise, for example, six degrees of freedom (6DoF) device tracking. This can be implemented, for example, using Simultaneous Localization and Mapping (SLAM). SLAM generally includes constructing and/or updating a map of an unknown environment while simultaneously keeping track of an agent's (e.g., the capture device's) location within the environment. One suitable approach uses ORB-SLAM with a monocular, stereo, and/or RGB-D camera of the capture device. It should be appreciated that this granularity of device tracking need not be employed in all embodiments, such as in embodiments of viewing and/or modifying environmental snapshots. In these cases, location could be determined using an IP address associated with the user device, a GPS receiver, or no location may be needed.

A device pose can include an orientation of the user device in the 3D space, position of the user device in the 3D space, one or more angles of the device along one or more axes with respect to the 3D spaces, and/or a height of the device in the 3D space. Any combination of this information may be incorporated into metadata of an environmental snapshot, such as to determine the perspective of the device to use for the snapshot (e.g. the device pose at the time the snapshot is taken).

User interaction manager 242 is configured to manage interactions between users. User interaction may manage one or more of the users using corresponding user accounts. User interaction manager 242 is configured to enforce permissions and/or user credentials associated with personal spaces, environmental snapshots, and/or 3D spaces. In some implementations, user interaction manager 242 is at least partially embodied in a social network, a chat application, a video conference, a messaging application, a blog, a web application, and/or a newsfeed, which may correspond to one or more of applications 110A, 110B, or 110N, and/or other applications, such as cloud based applications.

In some cases, user interaction manager 242 is responsible for managing messages, or notifications to users, such as any of the various messages or notifications described herein. To do so, user interaction manager 242 may employ event notifier 240. Event notifier 240 is generally responsible for providing user with the notifications or messages. For example, event notifier 240 can transmit messages and/or notifications of messages to users and/or accounts associated with users, such as email addresses. As described above, this could include notifications regarding user reactions captured using reaction capturer 218. As another example, notifications can be to an owner or creator of a 3D space or personal space regarding modification to the space (e.g., to an environmental snapshot and/or 3D space).

Trigger detector 220 is configured to determine which trigger criteria have been or have not been satisfied in order to detect whether one or more trigger actions should be performed. Any of the various components of system 206 may utilize trigger detector 220 to carry out one or more trigger actions in response to trigger detector 220 determining corresponding trigger criteria has been satisfied. It should therefore be appreciated that trigger detector 220 may utilize location information from device tracker 216 in order to detect device proximity. Further, the trigger actions can be performed using any combination of virtual reality renderer 224, augmented reality renderer 226, and event notifier 240.

In implementations where environmental snapshots are viewed and/or modified on a user device, this interaction can be accomplished by environmental interface 225 using environmental snapshot renderer 214. Environmental snapshot renderer 214 can render an environmental snapshot based on its corresponding metadata, such as depth information, as has been described above. As mentioned above, this can include determining placement of content, such as environmental content 244 in environmental snapshots, as well as modifying metadata and/or environmental snapshots to capture changes made the snapshots.

Figure 3A:
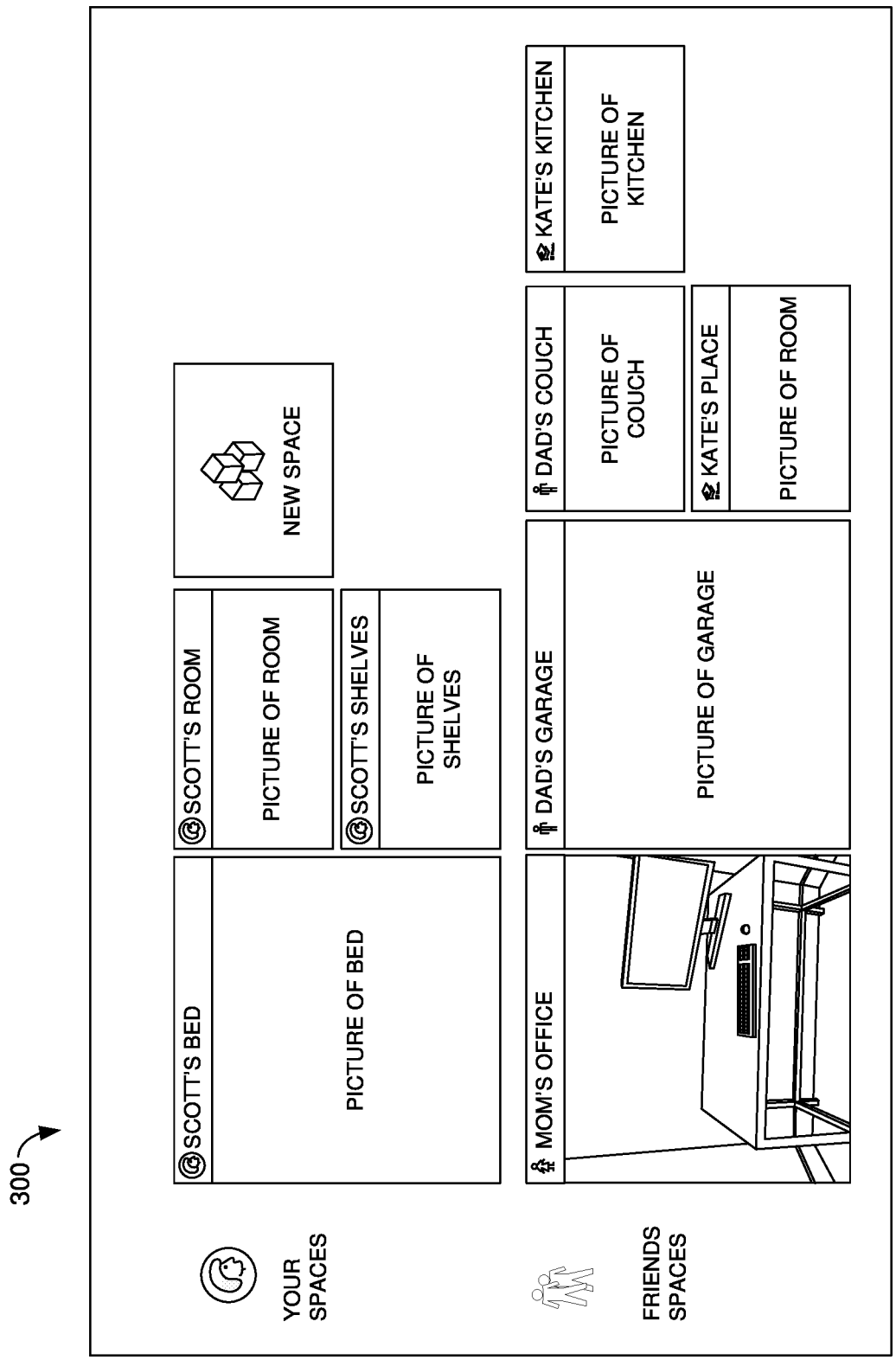
FIG. 3A illustrates an example interface, in accordance with embodiments of the present invention.

Referring to FIG. 3A, FIG. 3A shows user interface 300, such as a social network interface, which may be managed by user interaction manager 242. In the present example, a personal space screen that has been rendered for a user. As shown, user interface 300 comprises three personal spaces of the user, labeled "Scott's Bed," "Scott's Room," and "Scott's Shelves," each displayed with a corresponding representation of the associated space (e.g., a thumbnail). User interface 300 also comprises five personal spaces of other users, in particular friends of the user, which are labeled "Mom's Office," "Dad's Garage," "Dad's Couch," "Kate's Kitchen," and "Kate's place," each displayed with a corresponding representation of the associated space. The personal spaces of the friends may be displayed based on the user being friends with the other user and/or the other users having granted access to the personal space.

Figure 3B:
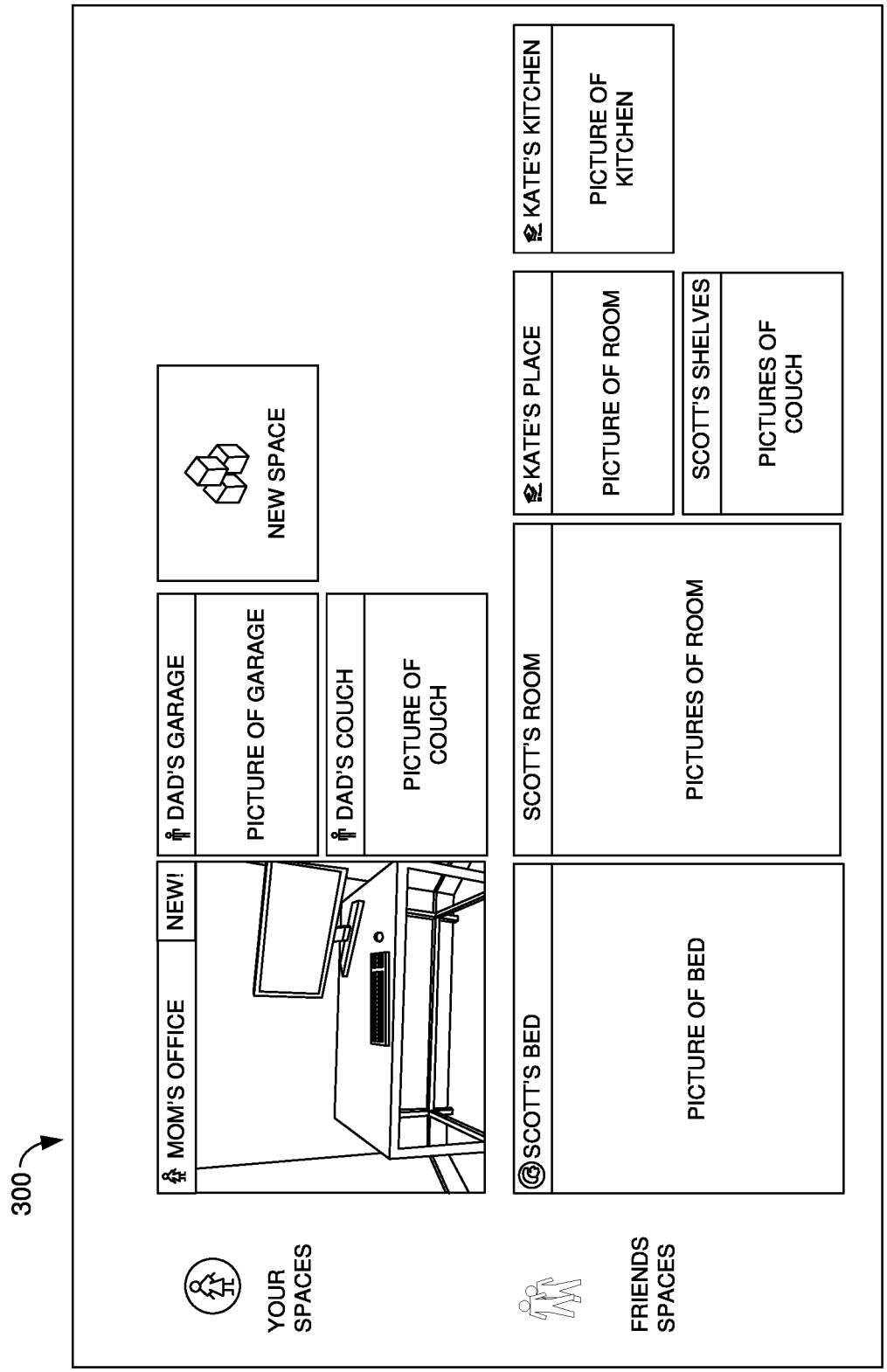
FIG. 3B illustrates an example interface, in accordance with embodiments of the present invention.

Assume the user accesses and modified the personal space corresponding to "Mom's Office," which is associated with another user. This may result in event notifier 240 causing a notification to be provided to that user. For example, FIG. 3B shows user interface 300 comprising a personal space screen that has been rendered for the other user. As shown, a notification "New" is provided in association with the modified personal space. The user may access the personal space to view the modified space as a 3D space or environmental snapshot.

Figure 4:
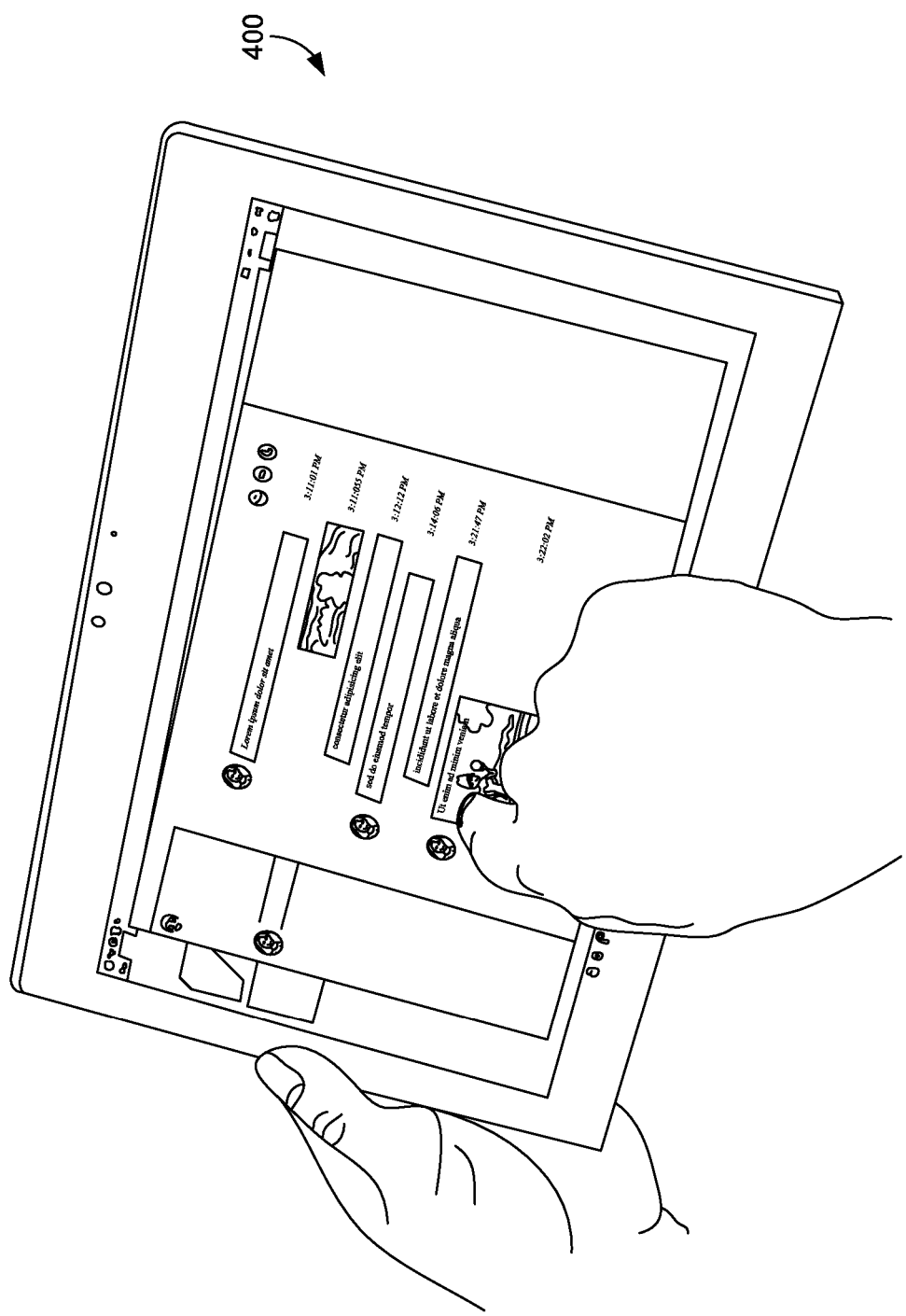
FIG. 4 illustrates an example interface, in accordance with embodiments of the present invention.

FIG. 4 shows another example, where a notification may be provided to the user in a chat application comprising user interface 400. The user may access the modified personal space by selecting a thumbnail or other link to the personal space, as shown.

Figure 5:
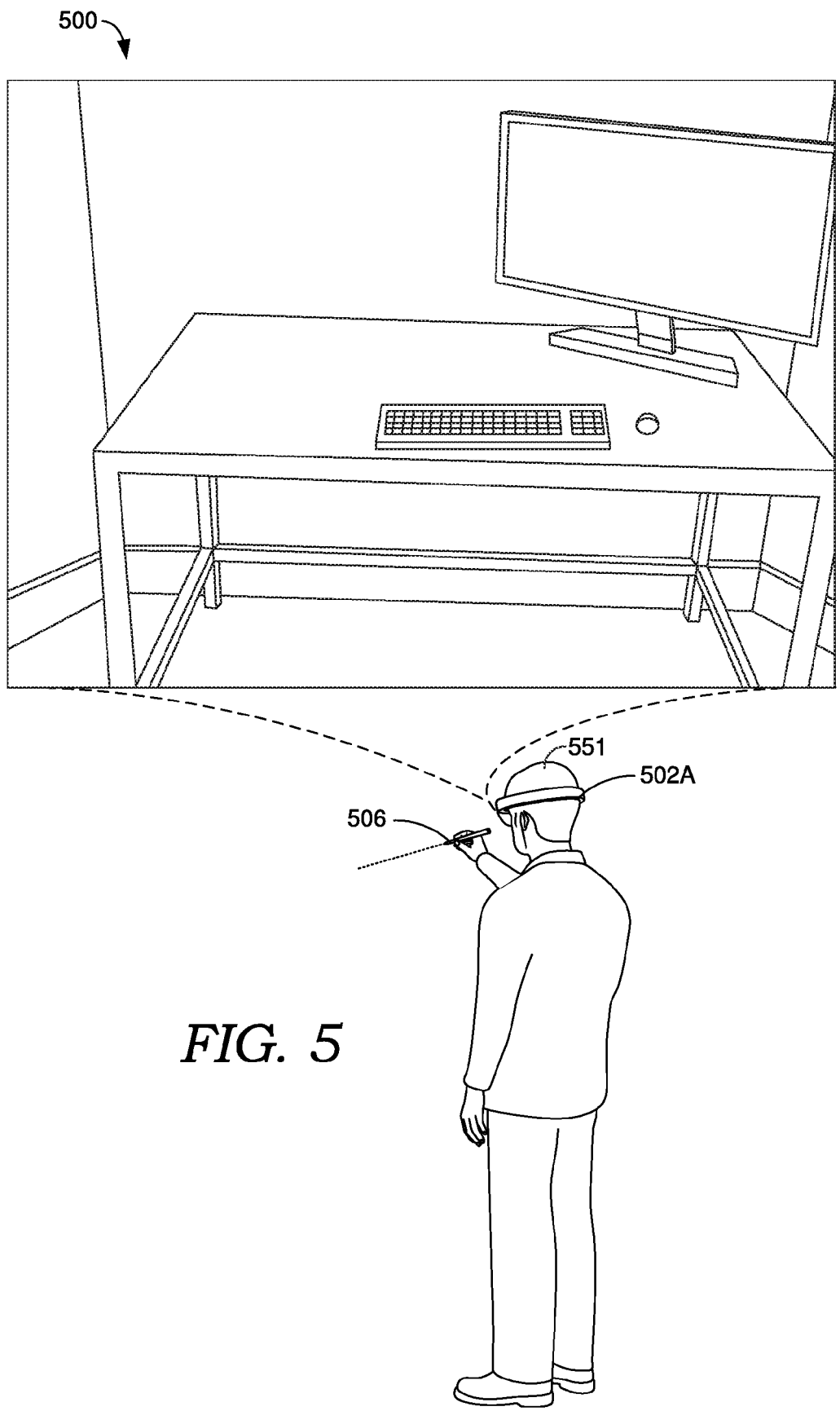
FIG. 5 illustrates a user viewing a 3D space, in accordance with embodiments of the present invention.

FIG. 5 shows a user viewing 3D space 500, which may be a personal space as described above, in accordance with some implementations of the present disclosure. User 551 is viewing 3D space 500 on user device 502A, which can correspond to one of the user devices of FIG. 1, such as user device 102A. In this example, user device 502A is an augmented reality device having a head-mounted display. In other cases, user device 502A could be a tablet based augmented reality device. Although not specifically shown, 3D space 500 may correspond to a real world environment of the user and could be a mixed-reality space comprising real and virtual objects, each of which may be captured in the 3D space. In some cases, the user may modify the 3D space using user input device 506 and/or some other input means, such as by virtually drawing on surface, placing content, such as virtual objects on real objects, and the like. In some cases, the user may be viewing the 3D space based on selection of a personal space, such as has been described with respect to FIGS. 3A, 3B, and 4.

As indicated above, in some implementations, the user can access a personal space by selecting the corresponding representation of the personal space in user interface 300. For example, a user could click on a thumbnail of a personal space. Based on the selection of a personal space, user interaction manager 242 may launch environmental interface 225 along with the appropriate renderer for the space, such as one of virtual reality renderer 224, augmented reality renderer 226, and environmental snapshot renderer 214. This may optionally be based on the criteria described above, such as the type of device accessing the space and/or whether the space has an associated environmental snapshot. It will further be appreciated that certain embodiments may support only a subset of these rendering modes and experiences. Selecting add space or new space may launch environmental interface 225 along with environmental capturer 212.

Figure 6:
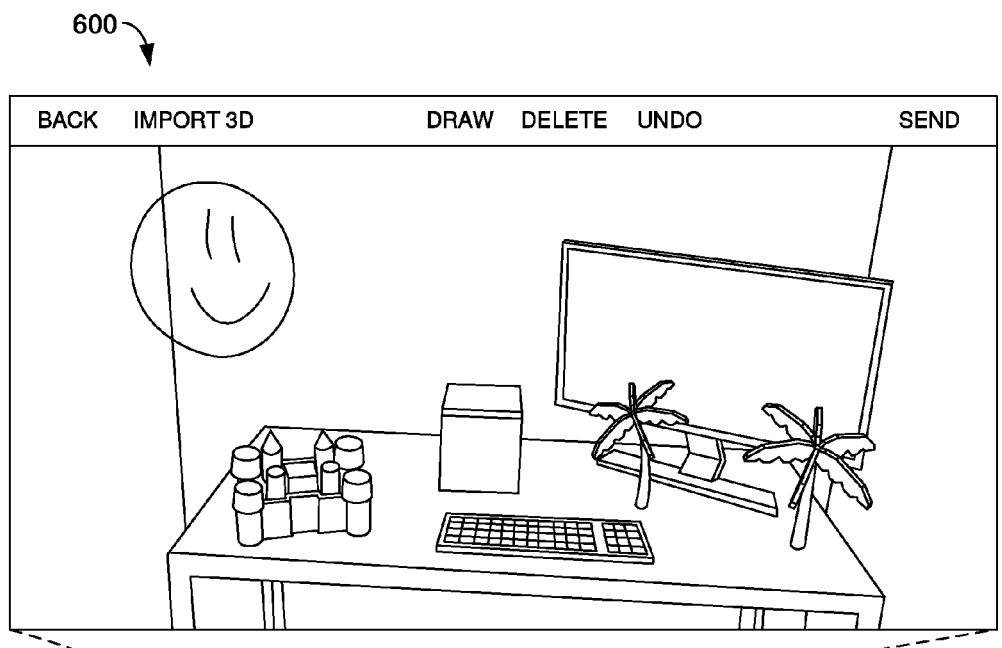
FIG. 6 illustrates a user viewing an environmental snapshot, in accordance with embodiments of the present invention.
Figure 6:
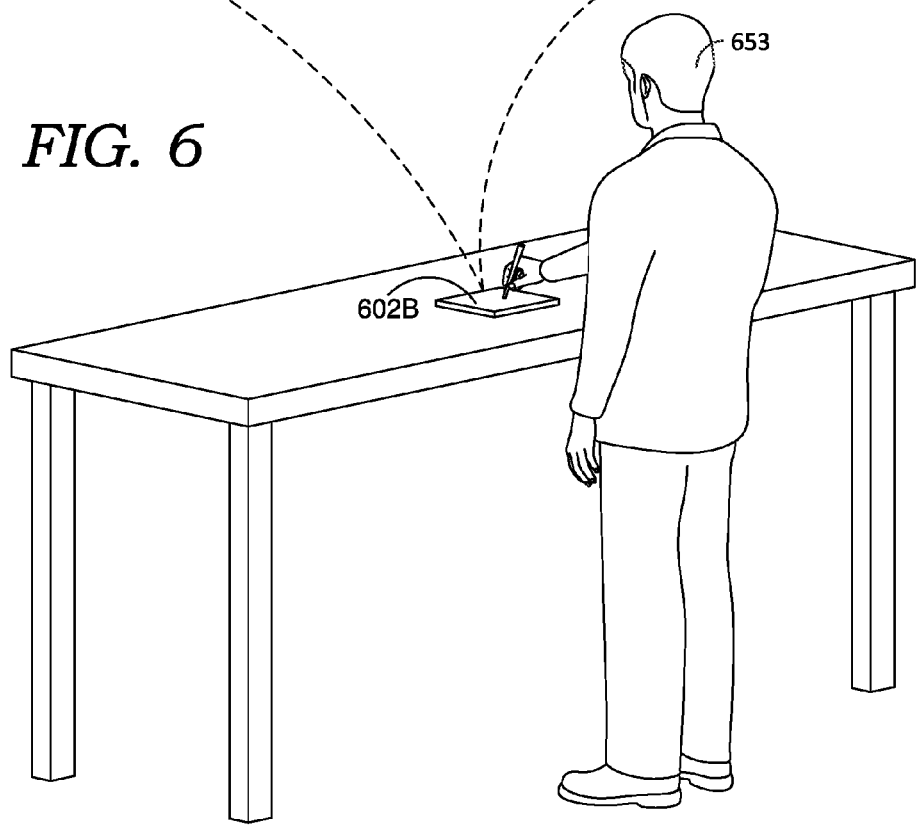

FIG. 6 shows a user viewing environmental snapshot 600 of space 500, which can be a 2.5 photo, in accordance with some implementations of the present disclosure. User 653 is viewing environmental snapshot 600 on user device 602A, which can correspond to one of the user devices of FIG. 1, such as user device 102B. In this example, user device 602B is a tablet device, which may or may not support environmental capture for augmented reality experiences. In some cases, the user may be viewing environmental snapshot 600 based on selection of a personal space, such as has been described with respect to FIGS. 3A, 3B, and 4. For example, environmental snapshot 600 may correspond to "Mom's Office."

As indicated in FIG. 6, user 653 has used environmental interface 225 and environmental snapshot renderer 214 to place environmental objects in environmental snapshot 600. These include two palm trees, a sand castle, a crate, and a smiley face drawing. The user may have drawn on the smiley face on the wall using environmental interface 225, where the positioning of the drawing uses depth information in metadata, as described above. Further, the remaining objects may be 3D objects. The user may place the objects in environmental snapshot 600, shown, as well as rotate the objects. As shown, using the depth information and/or 3D metadata, environmental snapshot 600 has directed the placement of the objects such that they appear to be placed on a desk, such as by translating the objects to a 3D coordinate system of the depth map. The view of the user could include some parallax, by might otherwise be fixed or otherwise restricted as has been described above. The modifications can be made using any suitable input modality such as touch screen, mouse, and keyboard. When the user has finished modifying snapshot, the user can hit a second button to cause the owner of the space to be notified.

Figure 7:
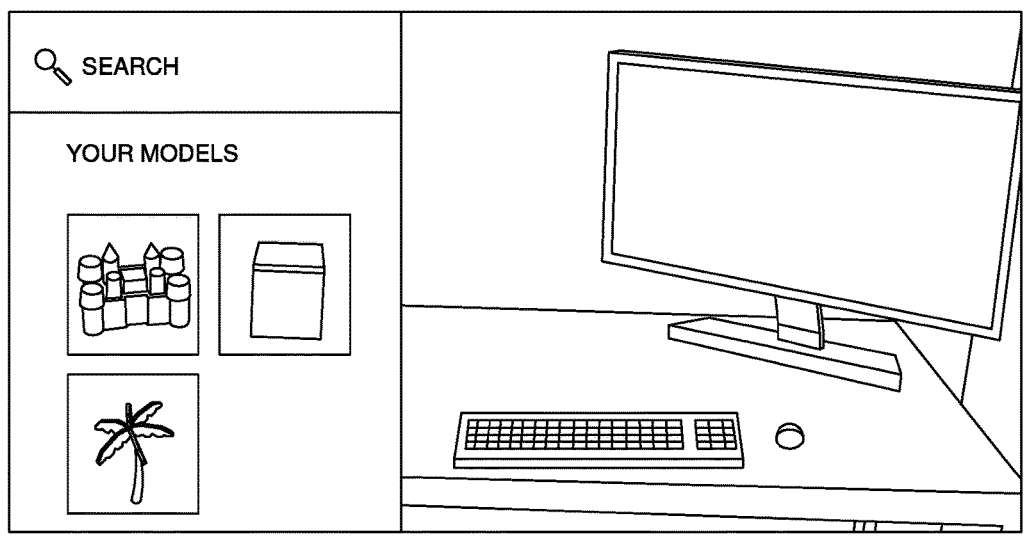
FIG. 7 illustrates an interface present in association with an environmental snapshot, in accordance with embodiments of the present invention.

FIG. 7 shows a user interface the user may have used to select the virtual objects from placement into environmental snapshot 600. The interface displays a catalogue of predefined objects, some of which may have been captured using environmental capturer 212. The user may also search for virtual objects, as shown.

Figure 8A:
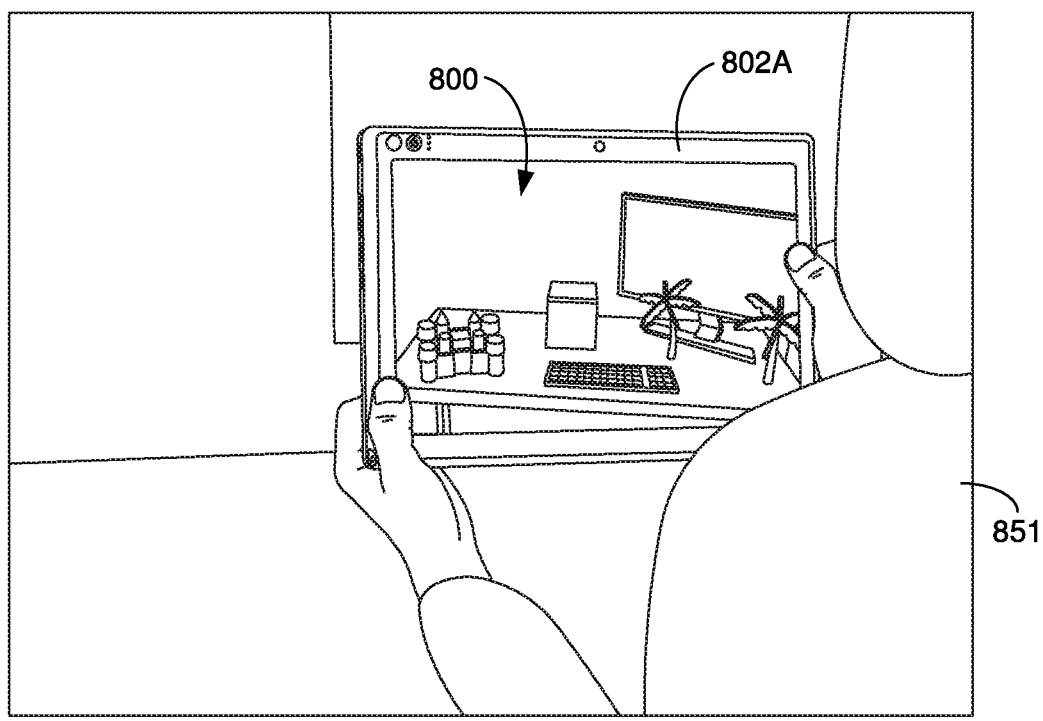
FIG. 8A illustrates a user viewing a 3D space, in accordance with embodiments of the present invention.

FIG. 8A shows a user viewing 3D space 800, which can correspond to 3D space 500 modified by environmental snapshot 600. User 851 is viewing 3D space 800 on user device 802A, which can correspond to one of the user devices of FIG. 1, such as user device 102A. User device 802A may be the same device or a different device as user device 502A of FIG. 5. Further user 851 may be the same user or a different user as user 551. In some cases, the user may be viewing the 3D space based on selection of a personal space, such as has been described with respect to FIGS. 3A, 3B, and 4.

As indicated in FIG. 8A, the user is in an augmented reality experience, where the desk and other real world objects are presented in real time. Further the virtual reality objects are presented in relation to the real world environment, such as based on the metadata from environmental snapshot 600. Also indicated in FIG. 8A, based on trigger detector 220 determining trigger criteria associated with the crate virtual object is satisfied, a trigger action is performed which is a shaking animation of the crate. In this case, the trigger criterion is proximity and/or location based, as has been described above. Other examples of content have been described above, which may be utilized in this scenario. As an example, the crate could instead be an AI character or pet, which reacts to the user and/or user device. The AI character may optionally be geo fenced to in the space.

Figure 8B:
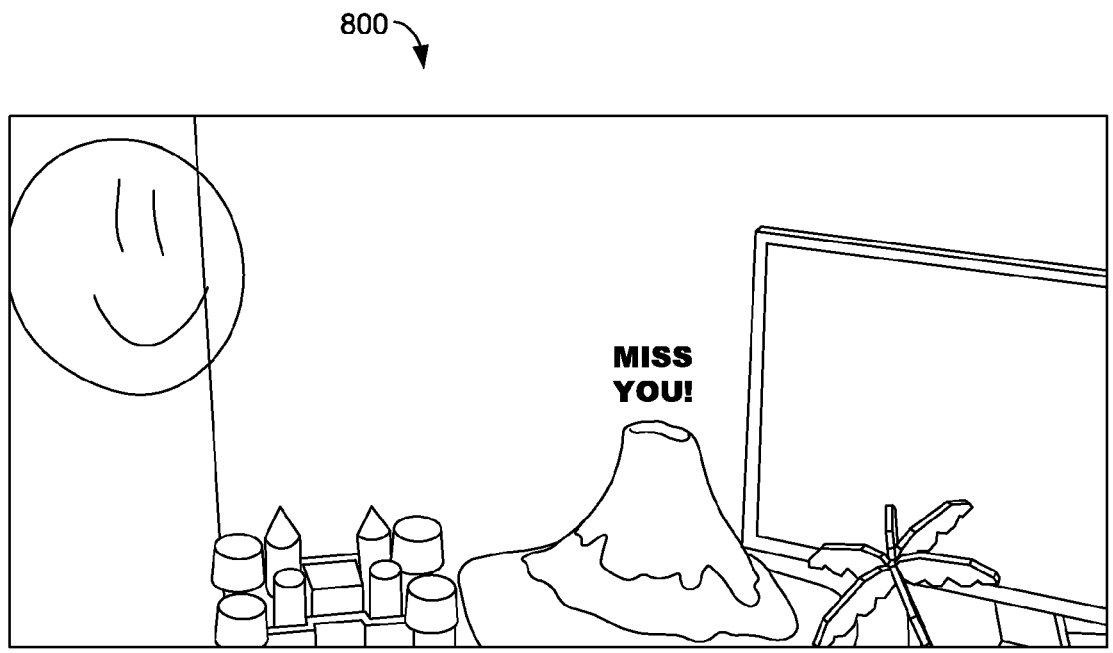
FIG. 8B illustrates a user viewing a 3D space, in accordance with embodiments of the present invention.

As indicated in FIG. 8B, a further trigger criterion has been satisfied causing the crate to be transformed into a virtual diorama, scene, or greeting card. This may also be proximity based and triggered by the user moving closer to the position of the virtual object in the augmented reality space.

Figure 9A:
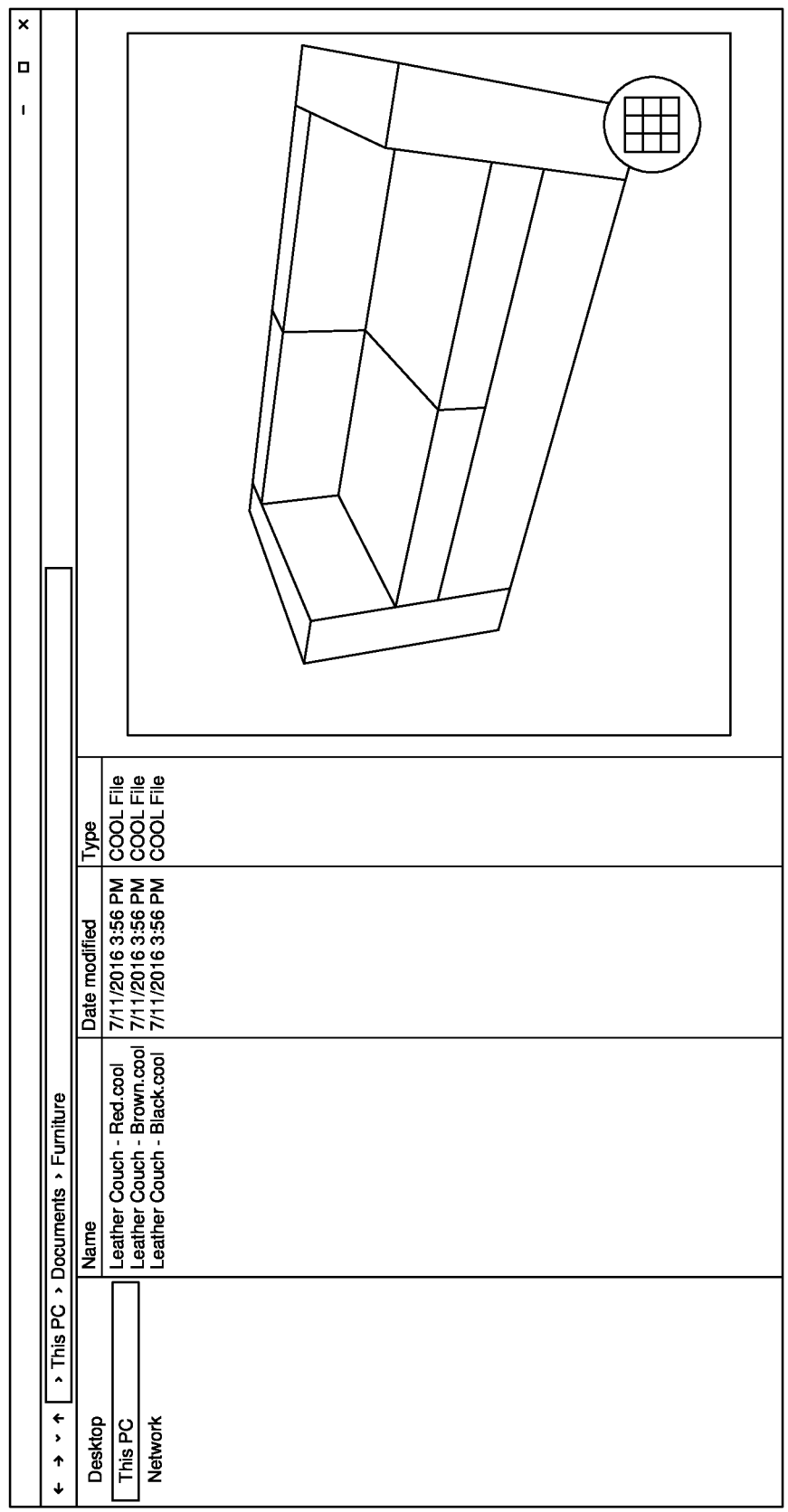
FIG. 9A illustrates a file system, in accordance with embodiments of the present invention.

FIG. 9A shows an implementation in which a user selects a 3D virtual object file in a file system. A preview of the object is displayed in the file system based on the selection, which may rotate. The user may selectively add the virtual item to an augmented reality space using the file system, for example, by selecting the grid icon on the representation of the virtual object, or another link. As shown in FIG. 9B, the selection has caused the virtual object to be added to the augmented reality space being viewed in FIG. 9B, and optionally may automatically shift to a view of the augmented reality space, as shown.

Figure 10A:
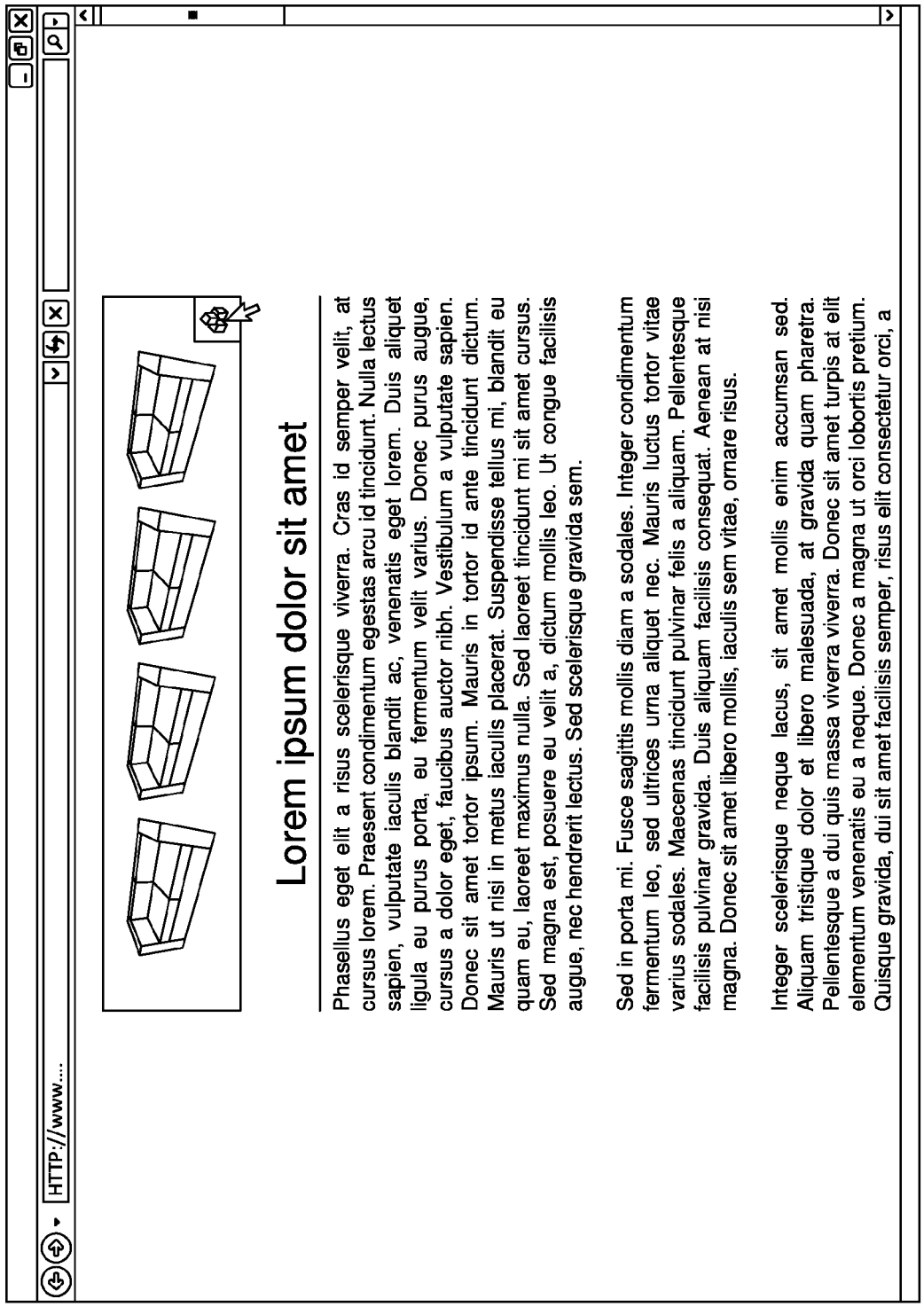
FIG. 10A illustrates a web page, in accordance with embodiments of the present invention.
Figure 10B:
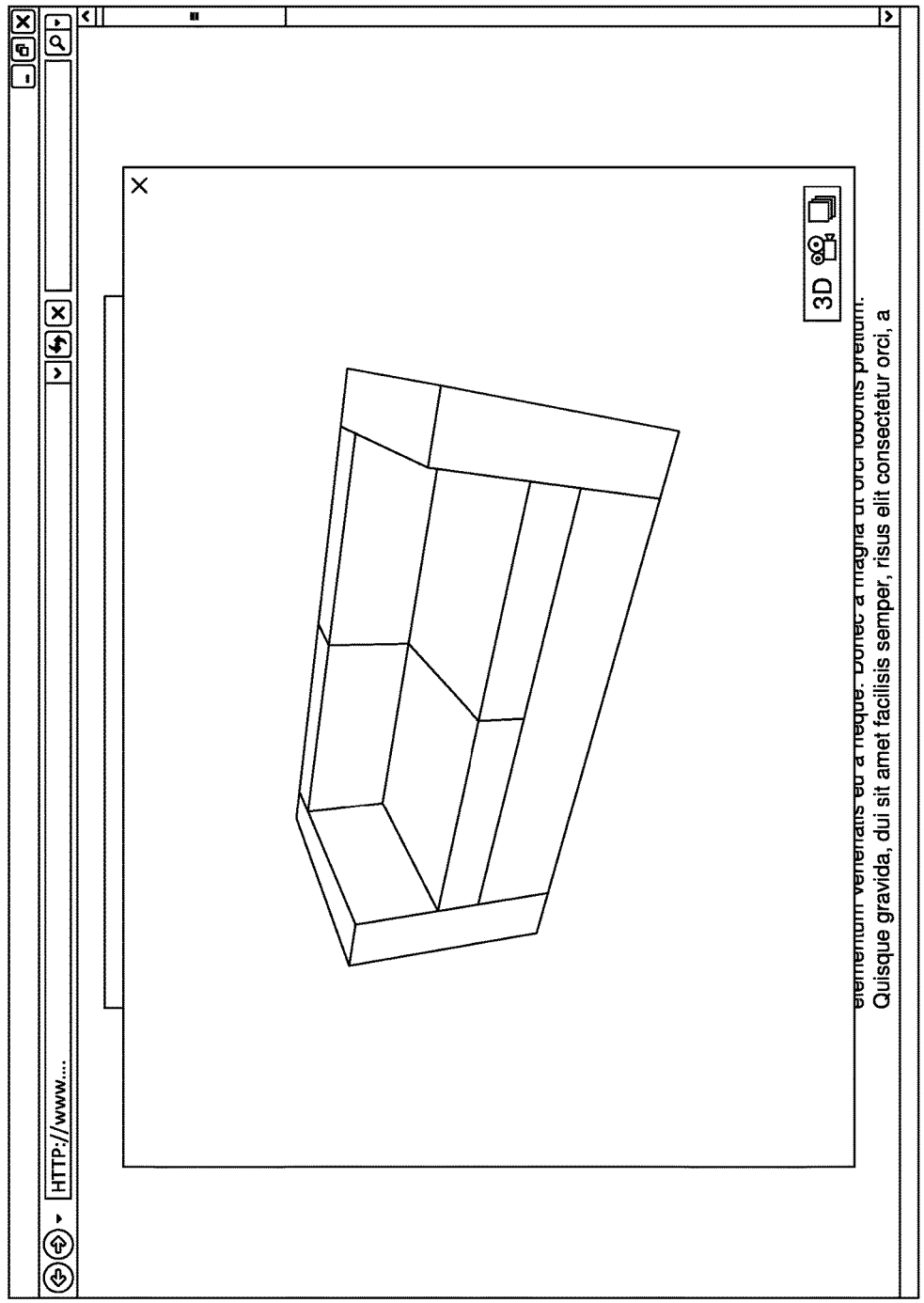
FIG. 10B illustrates a virtual object viewer, in accordance with embodiments of the present invention.
Figure 10D:
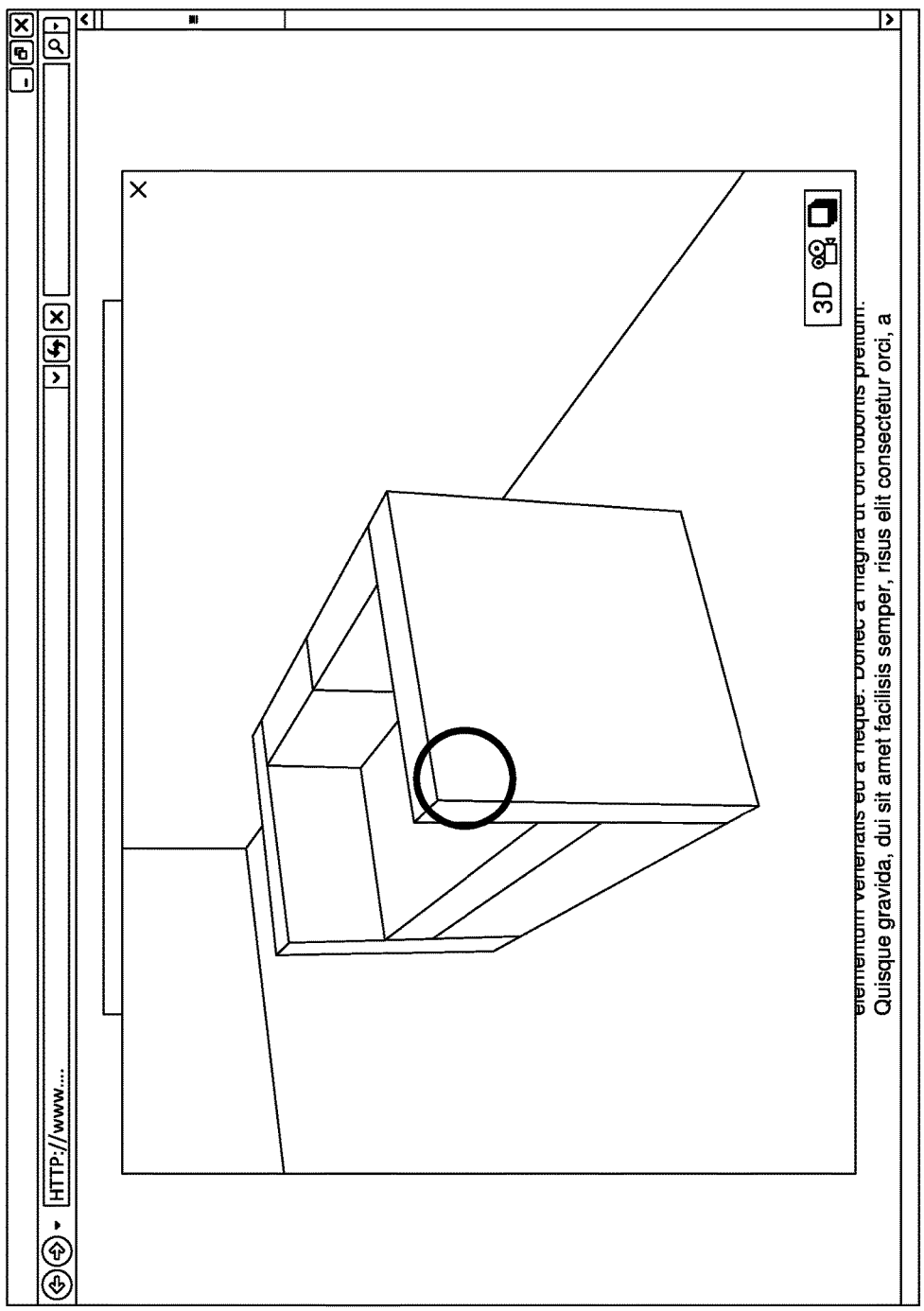
FIG. 10D illustrates a user viewing an environmental snapshot, in accordance with embodiments of the present invention.

FIG. 10A shows an implementation in which a user selects a 3D virtual object in a web page. For example, the selection could correspond to a banner, an ad, and/or an icon or link associated with the virtual object. The virtual object could be transmitted to the user device in association with the web page. Optionally, based on the selection, the virtual object may be presented in a 3D viewer or preview window, as shown in FIG. 10B. Additionally, based on the selection, the user may view the virtual object in an augmented reality space, as shown in FIG. 10C. As an example, this could be accomplished by selecting the camera icon in FIG. 10B. As another example, based on the selection, the user may view the virtual object in an environmental snapshot, as shown in FIG. 10D. As an example, this could be accomplished by selecting the photo icon in FIG. 10B. As indicated in FIG. 10D, the user can position the content in the environmental snapshot, such as has been previously described herein. Any combination of this functionality may be integrated into a web browser natively and/or via plug-ins.

From the forgoing it will be appreciated that some implementations of the present disclosure present augmented reality content that does not present itself to the user until the user gets near it or otherwise satisfies some trigger condition. Further aspects of the present disclosure allow for sharing metadata (e.g. 3D metadata) with 2D photos or images to enable shared mixed-reality spaces. In further respects, when a user interacts with a message, which may correspond to a modification to an environmental snapshot, the user's reaction can be dynamically recorded by reaction capturer 218 and may be served up to share. Further, in some respects, environmental snapshots may be synced to 3D spaces using the metadata.

In further respects, an environmental snapshot can be taken using the RDB and depth sensing capabilities of one or more cameras of a user device to map what the device is displaying to additional data in metadata, such as the scale of the scene, the location of the device, and more. Depth information in metadata can be per each pixel of photo.

In further respects, a separate device that is not a mixed-reality enabled device can interact with the environmental snapshot as if it is a natural space. The metadata can convey which orientation information such as which direction is up or down, as well as other info not in a typical photo, to direct placement of content.

In some respects, the modifications can be brought back to a mixed reality device and it can be mapped there. It is noted the original 3D space need not be preserved for mapping, but could be regenerated in real-time.

The present disclosure further provides for different views of personal spaces based on permissions or sharing by determined by the owner of the space. For example, is a personal space is open to the public, the public may see a different version of the augmented reality than friends of users designated by the owner. As another example, each user or group of users could be associated with a corresponding version of a personal space.

Further aspects of the present disclosure allow for digital geocaching, scavenger hunting, or treasure hunting amongst many users. A user may hide digital content in the real world during an augmented reality experience. Only one person can claim that content upon discovering it in the augmented reality at the real world location. In some cases, upon being claimed by a user the content may be replaced with other content.

It should be appreciated that implementations of the present disclosure allow to time shifted and/or real-time interactions between users in shared spaces. For example, user 551 and user 653 could be interacting with the same personal space in real-time. Implementations of the present disclosure enable these types of interactions between augmented reality enabled devices and non-augmented reality devices or devices running in a non-augmented reality mode. In some cases, environmental snapshots could correspond to video frames at least some frames may share common metadata. In real-time interactions, instant messaging, voice communication, and other interaction mechanisms may be integrated into the user interfaces. Further as indicated above, these interactions may be hosted by an instant messaging planform, video chat platform, social networking platform, and the like, which may maintain friend lists and the like.

In should also be appreciated that in user interactions described herein, each user may be in a virtual reality or augmented reality experience. For example, the augmented reality content items may be shared between users in a video chat environment.

Figure 11:
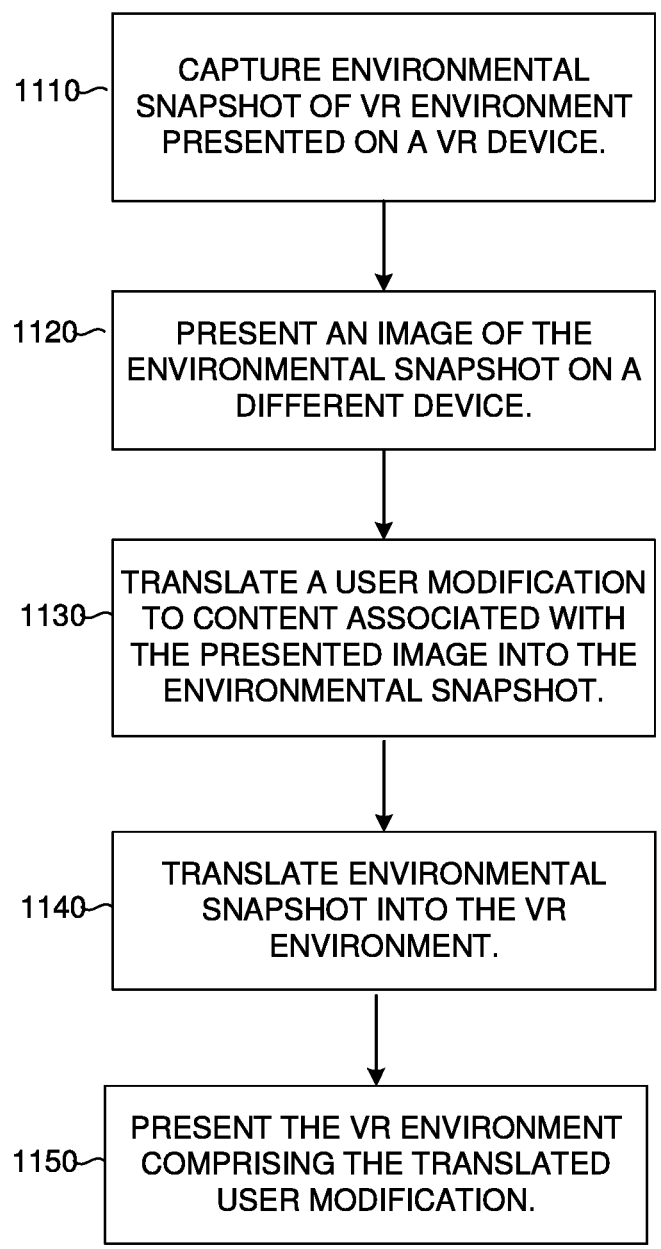
FIG. 11 illustrates a flow diagram of a method, in accordance with embodiments of the present invention.

Referring now to FIG. 11, a flow diagram is provided showing an embodiment of a method 1100 in accordance with disclosed embodiments. Each block of method 1100 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 1110, method 1100 includes capturing an environmental snapshot of a VR environment presented on a VR device. For example, environmental capturer 212 can capture one of environmental snapshots 234 comprising an image of a VR environment corresponding to one of 3D environments 232 presented on a VR device (e.g., user device 502A) using virtual reality renderer 224 along with corresponding depth information of the VR environment.

At block 1120, method 1100 includes presenting an image of the environmental snapshot on a different device. For example, environmental snapshot renderer 214 can present the image of the environmental snapshot on a different device (e.g., user device 602B) than the VR device.

At block 1130, method 1100 includes translating a user modification to content associated with the presented image into the environmental snapshot. For example, environmental interface 225 can translate modifications made by user 653 to content associated with the presented image into the environmental snapshot based on the depth information. This can include, for example, placing, removing, and/or altering environmental objects in environmental snapshot 600.

At block 1140, method 1100 includes translating the environmental snapshot into the VR environment. For example, environmental interface 225 can translate environmental snapshot 600 into the VR environment using environmental snapshot renderer 214.

At block 1150, method 1100 includes presenting the VR environment comprising the translated user modification. For example, virtual reality renderer 224 can present the VR environment on user device 802A, as shown in FIG. 8A, or on user device 502A.

Figure 12:
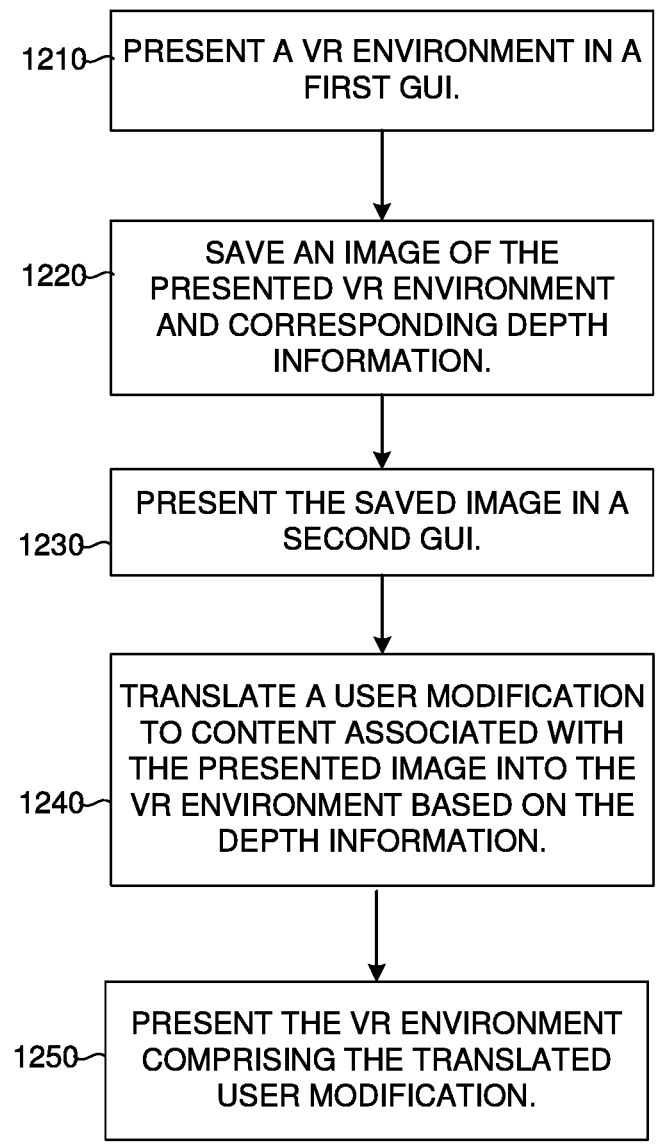
FIG. 12 illustrates a flow diagram of a method, in accordance with embodiments of the present invention.

Referring now to FIG. 12, a flow diagram is provided showing an embodiment of a method 1200 in accordance with disclosed embodiments. At block 1210, method 1200 includes presenting a VR environment in a first graphical user interface (GUI). For example, a 3D space 500 can be presented in a first graphical user interface, as shown in FIG. 5.

At block 1220, method 1200 includes saving an image of the presented VR environment and corresponding depth information. For example, an image of 3D space 500 can be saved in association with corresponding depth information of 3D space 500 in environmental snapshot 600.

At block 1230, method 1200 includes presenting the saved image in a second GUI. For example, the saved image can be presented in a second GUI, as shown in FIG. 6.

At block 1240, method 1200 includes translating a user modification to content associated with the present image into the VR environment based on the depth information. For example, one or more user modifications to content associated with the presented image can be translated into 3D space 500 based on the depth information.

At block 1250, method 1200 includes presenting the VR environment comprising the translated user modification. For example, 3D space 500 comprising the translated user modification can be presented, as shown in FIG. 8A.

Figure 13:
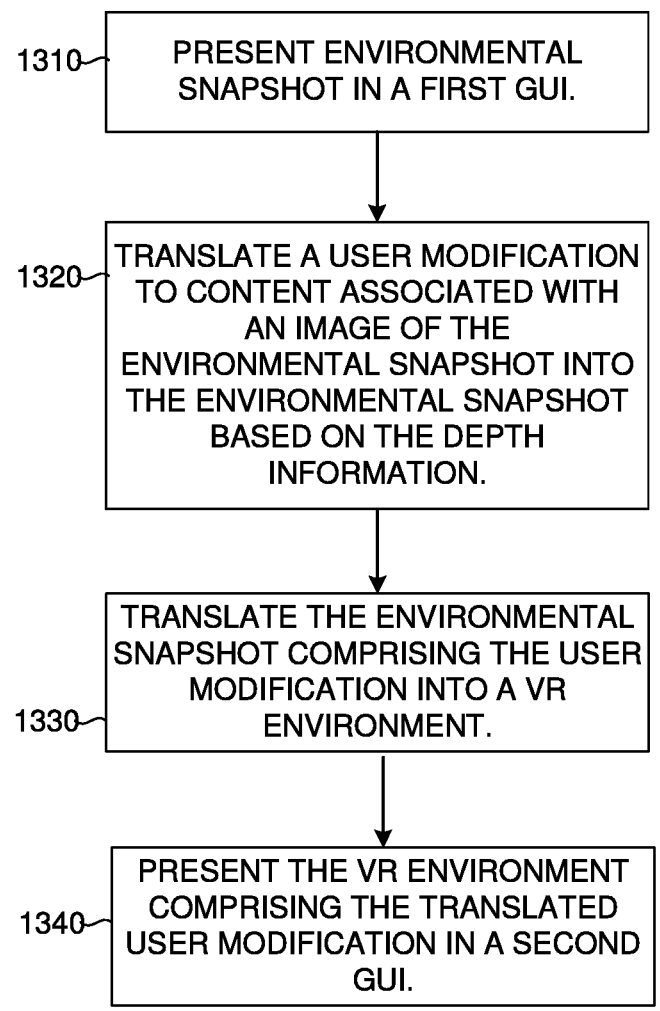
FIG. 13 illustrates a flow diagram of a method, in accordance with embodiments of the present invention.

Referring now to FIG. 13, a flow diagram is provided showing an embodiment of a method 1300 in accordance with disclosed embodiments. At block 1310, method 1300 includes presenting an environmental snapshot in a first GUI. At block 1320, method 1300 includes translating a user modification to content associated with an image of the environmental snapshot into the environmental snapshot based on the depth information. At block 1330, method 1300 includes translating the environmental snapshot comprising the user modification into a VR environment. At block 1340, method 1300 includes presenting the VR environment comprising the translated user modification in a second GUI.

Figure 14:
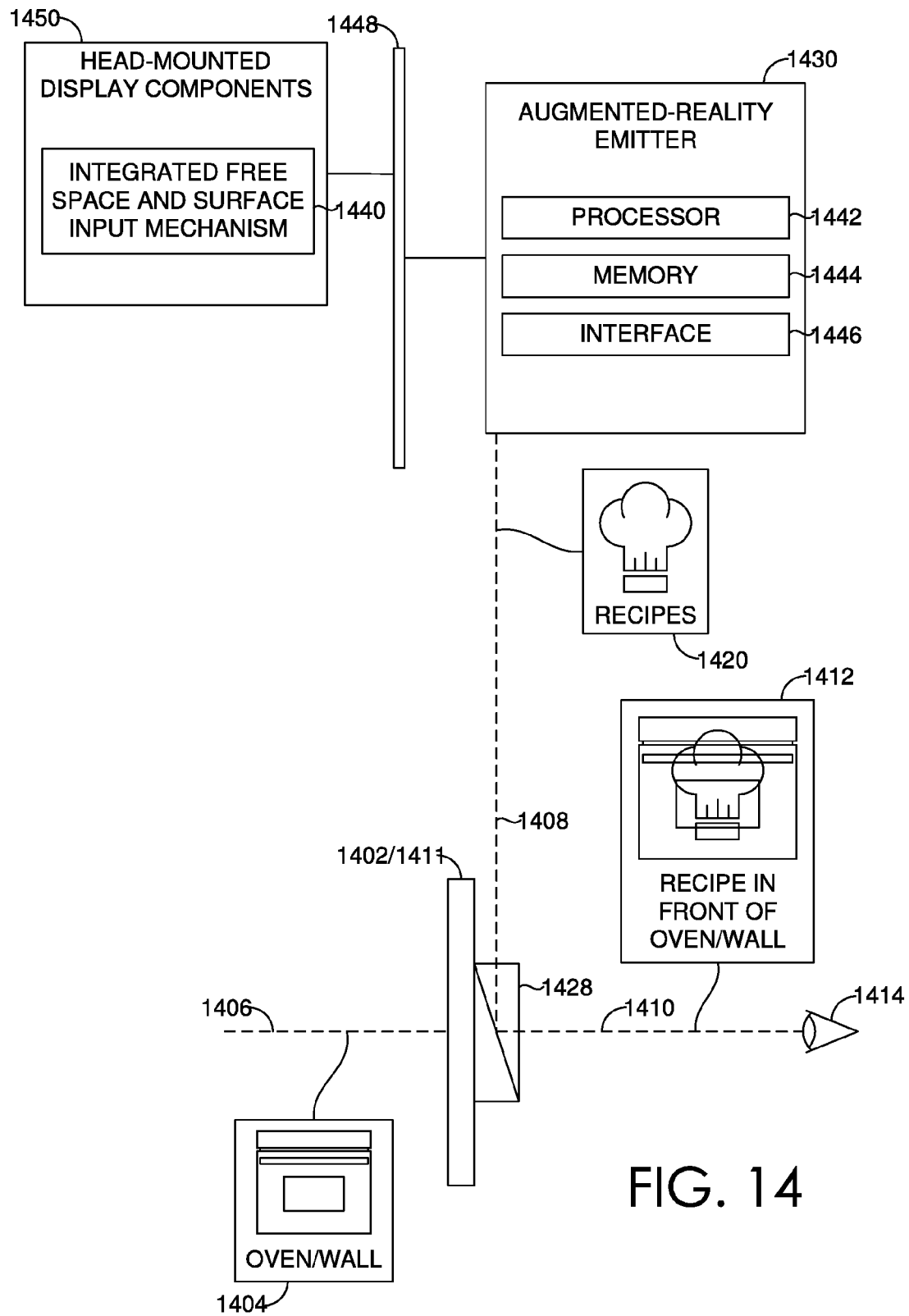
FIG. 14 is a block diagram of an example head-mounted display device, in accordance with embodiments of the present invention.

Turning to FIG. 14, the HMD device 1402 having the integrated free space and surface input mechanism 1440 is described in accordance with an embodiment described herein. The HMD device 1402 includes a see-through lens 1411 which is placed in front of a user's eye 1414, similar to an eyeglass lens. It is contemplated that a pair of see-through lenses 1411 can be provided, one for each eye 1414. The lens 1411 includes an optical display component 1428, such as a beam splitter (e.g., a half-silvered mirror). The HMD device 1402 includes an augmented reality emitter 1430 that facilitates projecting or rendering the of augmented reality images. Amongst other components not shown, the HMD device also includes a processor 1442, memory 1444, interface 1446, a bus 1448, and additional HMD components 1450. The augmented reality emitter 1430 emits light representing a virtual image 1420 exemplified by a light ray 1408. Light from the real-world scene 1404, such as a light ray 1406, reaches the lens 1411. Additional optics can be used to refocus the virtual image 1420 so that it appears to originate from several feet away from the eye 1414 rather than one inch away, where the display component 1428 actually is. The memory 1444 can contain instructions which are executed by the processor 1442 to enable the augmented reality emitter 1430 to perform functions as described. One or more of the processors can be considered to be control circuits. The augmented reality emitter communicates with the additional HMD components 1450 using the bus 1448 and other suitable communication paths.

A light ray representing the virtual image 1420 is reflected by the display component 1428 toward a user's eye, as exemplified by a light ray 1410, so that the user sees an image 1412. In the augmented-reality image 1412, a portion of the real-world scene 1404, such as, a cooking oven is visible along with the entire virtual image 1420 such as a recipe book icon. The user can therefore see a mixed-reality or augmented-reality image 1412 in which the recipe book icon is hanging in front of the cooking oven in this example.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Having described embodiments of the present invention, an example operating environment in which embodiments of the present invention may be implemented is described below in order to provide a general context for various aspects of the present invention. Referring initially to FIG. 15 in particular, an example operating environment for implementing embodiments of the present invention is shown and designated generally as computing device 1500. Computing device 1500 is but one example of a suitable computing environment and is not intended to suggest any limitation as to the scope of use or functionality of the invention. Neither should the computing device 1500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 15, computing device 1500 includes a bus 1510 that directly or indirectly couples the following devices: memory 1512, one or more processors 1514, one or more presentation components 1516, input/output ports 1518, input/output components 1520, and an illustrative power supply 1522. Bus 1510 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 15 is merely illustrative of an example computing device that can be used in connection with one or more embodiments of the present invention. Distinction is not made between such categories as "workstation," "server," "laptop," "hand-held device," etc., as all are contemplated within the scope of FIG. 15 and reference to "computing device."

Computing device 1500 typically includes a variety of computer-readable media. Computer-readable media can be any available media that can be accessed by computing device 1500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1512 includes computer storage media in the form of volatile and/or nonvolatile memory. The memory may be removable, non-removable, or a combination thereof. Example hardware devices include solid-state memory, hard drives, optical-disc drives, etc. Computing device 1500 includes one or more processors that read data from various entities such as memory 1512 or I/O components 1520. Presentation component(s) 1516 present data indications to a user or other device. Example presentation components include a display device, speaker, printing component, vibrating component, etc.

I/O ports 1518 allow computing device 1500 to be logically coupled to other devices including I/O components 1520, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a head-mounted display device as an augmented reality device; however, the head-mounted display device depicted herein is merely example. Components can be configured for performing novel aspects of embodiments, where configured for comprises programmed to perform particular tasks or implement particular abstract data types using code. Further, while embodiments of the present invention may generally refer to the head-mounted display device and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method comprising:
capturing, using one or more depth sensing cameras of an augmented reality (AR) device and in response to a user selection of a corresponding option using the AR device while an AR environment is presented on the AR device, an environmental snapshot comprising a two-and-a-half-dimensional (2.5D) image corresponding to the AR environment presented on the AR device, the 2.5D image comprising a bitmap depicting a view of three-dimensional (3D) space of the AR environment and corresponding depth information;
presenting the 2.5D image of the environmental snapshot on a different device than the AR device;
translating a user modification to content associated with the presented 2.5D image into the environmental snapshot based on the depth information;
translating the environmental snapshot comprising the user modification into the AR environment; and
presenting the AR environment comprising the translated user modification.

2. The method of claim 1, wherein the user modification comprises a user placement of the content behind other content in the environmental snapshot based on the depth information.

3. The method of claim 1, wherein the translating of the user modification is to a three-dimensional (3D) coordinate system corresponding to the depth information.

4. The method of claim 1, wherein during the user modification, the content is depicted at a size scaled based on the depth information.

5. The method of claim 1, wherein the AR environment comprises a three-dimensional (3D) representation of a real world environment sensed by the AR device and one or more virtual objects added to the real world environment.

6. The method of claim 1, wherein a perspective depicted in the 2.5D image corresponds to a user perspective of the AR environment displayed in association with the capturing of the environmental snapshot at a time of the user selection of the corresponding option.

7. The method of claim 1, wherein the user selection is of a graphical interface element displayed in association with the presented AR environment.

8. The method of claim 1, wherein the content comprises a virtual object having at least one predefined trigger action associated with trigger criteria, and the presenting of the AR environment comprises performing the at least one predefined trigger action with respect to the virtual object based on determining the trigger criteria is satisfied.

9. The method of claim 1, wherein the presenting of the AR environment comprises capturing a user reaction to the content.

10. A computer-implemented system comprising:
one or more processors; and
one or more computer storage media storing computer-useable instructions that, when executed by the one or more processors, cause the one or more processors to perform operations comprising:

presenting a virtual reality (VR) environment in a first graphical user interface;

in response to a user selection of a corresponding option associated with the first graphical user interface, saving a two-and-a-half-dimensional (2.5D) image corresponding to the presented VR environment, the 2.5D image comprising a view of three-dimensional (3D) space of the VR environment and corresponding depth information;

presenting the saved 2.5D image in a second graphical user interface;

translating a user modification to content associated with the presented 2.5D image into the VR environment based on the depth information; and presenting the VR environment comprising the translated user modification.

11. The computer-implemented system of claim 10, wherein a perspective captured in the 2.5D image corresponds to a position of a user device in the VR environment at a time of the user selection, the user device displaying the VR environment during the presenting.

12. The computer-implemented system of claim 10, wherein the saving of the 2.5D image is in association with a personal space of a user, and the presenting of the VR environment comprises:

automatically triggering a recording of a user reaction to the content based on a position of a user device relative to the content in the VR environment; and transmitting the recording to the user based on the association with the personal space.

13. The computer-implemented system of claim 10, wherein the saving of the 2.5D image is in association with a personal space of a first user, and the method further comprises:

presenting to a second user a plurality of personal spaces comprising the personal space in a social network interface; and receiving an additional user selection associated with the presented personal space, wherein the presenting of the saved 2.5D image is based on the additional user selection.

14. The computer-implemented system of claim 10, wherein during the user modification, the content is visually scaled based on the depth information.

15. The computer-implemented system of claim 10, wherein a perspective depicted in the 2.5D image corresponds to a user perspective of the VR environment displayed in association with the saving of the 2.5D image.

16. One or more non-transitory computer-readable media having executable instructions embodied thereon, which, when executed by one or more processors, cause the one or more processors to perform a method, the method comprising:

presenting, in a first graphical user interface, an environmental snapshot comprising a two-and-a-half-dimensional (2.5D) image corresponding to a virtual reality (VR) environment, the 2.5D image depicting a view of three-dimensional (3D) space of the VR environment and corresponding depth information;

translating a user modification to content associated with the 2.5D image of the presented environmental snapshot into the environmental snapshot based on the depth information;

translating the environmental snapshot comprising the user modification into the VR environment; and presenting the VR environment comprising the translated user modification in a second graphical user interface.

17. The one or more computer-readable media of claim 16, wherein the user modification corresponds to a user positioning the content in three-dimensional space.

18. The one or more computer-readable media of claim 16, wherein the translating of the user modification is to a 3D coordinate system corresponding to the depth information.

19. The one or more computer-readable media of claim 16, wherein during the user modification, the content is depicted at a size scaled based on the depth information.

20. The one or more computer-readable media of claim 16, wherein the VR environment is an augmented reality environment.

* * * * *